Aug. 22, 1950 J. E. OSTLINE 2,519,849

AUTOMATIC TELEPHONE SYSTEM

Filed Feb. 7, 1947 9 Sheets-Sheet 1

Inventor
John E. Ostline

By
Davis, Lindsey, Smith & Shoots
Attorneys

AUTOMATIC TELEPHONE SYSTEM

Filed Feb. 7, 1947

9 Sheets-Sheet 2

Inventor
John E. Ostline
By
Davis, Lindsey, Smith & Shonts
Attorneys

Inventor
John E. Ostline
By
Davis, Lindsey, Smith & Shonts
Attorneys

Aug. 22, 1950 J. E. OSTLINE 2,519,849

AUTOMATIC TELEPHONE SYSTEM

Filed Feb. 7, 1947 9 Sheets-Sheet 4

Inventor
John E. Ostline
By
Davis, Lindsey, Smith & Shonts
Attorneys

Inventor
John E. Ostline
By
Davis, Lindsey, Smith & Shonts
Attorneys

Inventor
John E. Ostline
By
Davis, Lindsey, Smith & Shonts
Attorneys

Aug. 22, 1950 J. E. OSTLINE 2,519,849

AUTOMATIC TELEPHONE SYSTEM

Filed Feb. 7, 1947 9 Sheets-Sheet 7

Inventor
John E. Ostline
By
Davis, Lindsey, Smith & Shonts
Attorneys

Aug. 22, 1950 J. E. OSTLINE 2,519,849

AUTOMATIC TELEPHONE SYSTEM

Filed Feb. 7, 1947 9 Sheets-Sheet 8

Inventor
John E. Ostline
By
Davis, Lindsey, Smith & Shonts
Attorneys

AUTOMATIC TELEPHONE SYSTEM

Filed Feb. 7, 1947 9 Sheets-Sheet 9

Inventor
John E. Ostline
By Davis, Lindsey, Smith & Shonts
Attorneys

Patented Aug. 22, 1950

2,519,849

UNITED STATES PATENT OFFICE 2,519,849

AUTOMATIC TELEPHONE SYSTEM

John E. Ostline, Chicago, Ill., assignor to Automatic Electric Laboratories, Inc., Chicago, Ill., a corporation of Delaware Application February 7, 1947, Serial No. 727,175

32 Claims. (Cl. 179—22)

Figure 1:
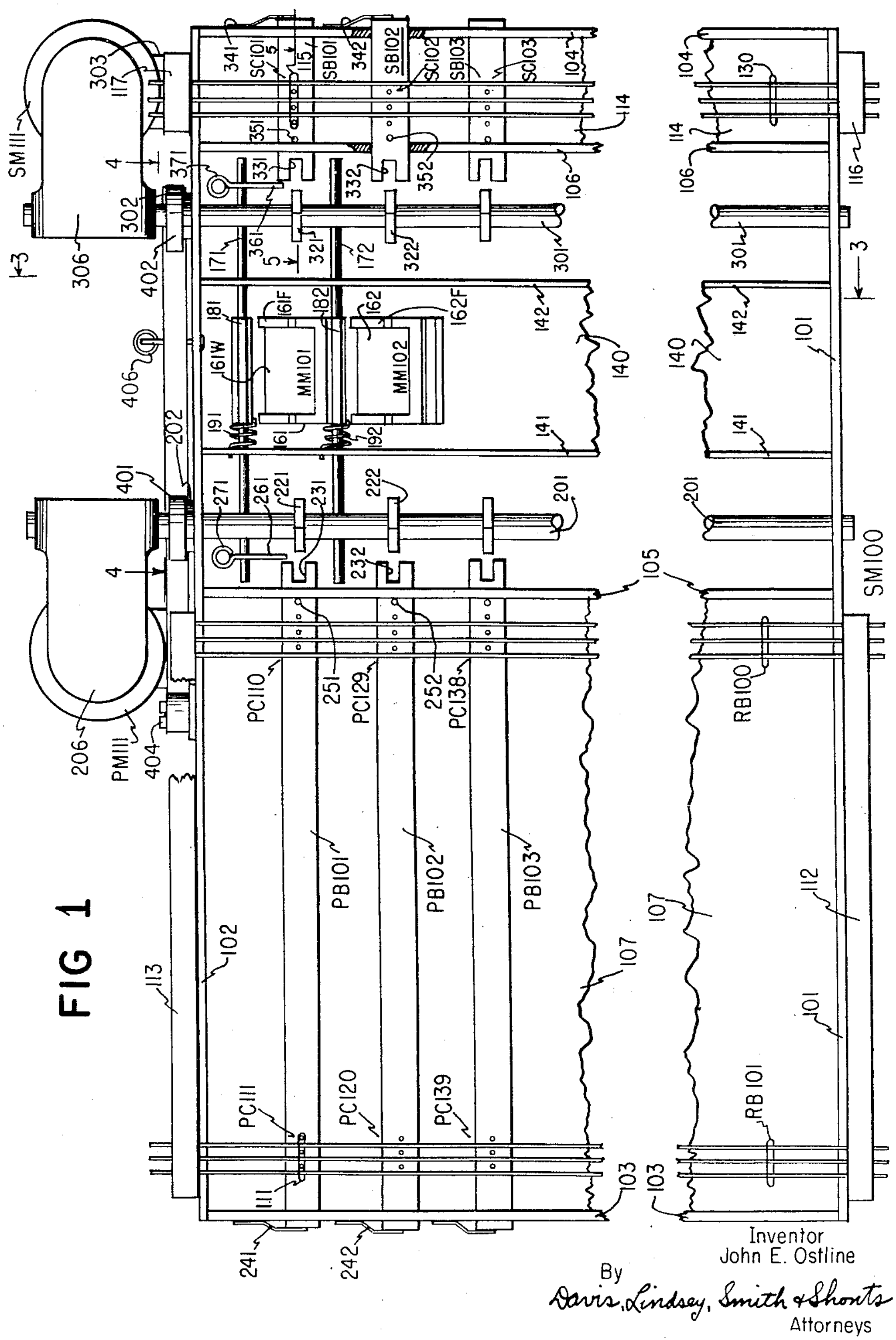

The present invention relates to automatic telephone systems and, more particularly, to improved automatic switching apparatus for setting up telephone connections.

It is an object of the present invention to provide a telephone system in which connections may be set up by automatic switching apparatus to telephone lines employing directory numbers corresponding to the line terminals, wherein each individual automatic switch utilized comprises register mechanism that does not require releasing and resetting between successive signals received thereby in order to control successive coordinate operations of the switch.

Another object of the invention is to provide an automatic switch that comprises improved register mechanism which may be operated in accordance with a first signal received directly from its home position to a first position in order to bring about a first operation of the switch corresponding to the first signal received, and then operated in accordance with a second signal inclined directly from its first position to a second position in order to bring about a second operation of the switch corresponding to the second signal received.

Another object of the invention is to provide in an automatic telephone system a finder incorporating an automatic switch of the character described.

Another object of the invention is to provide in an automatic telephone system a selector incorporating an automatic switch of the character described.

Another object of the invention is to provide in an automatic telephone system a connector incorporating an automatic switch of the character described.

A further object of the invention is to provide an automatic switch of improved construction and arrangement that comprises a plurality of primary members and a plurality of secondary members and a plurality of selecting magnets respectively associated with the primary members and with the secondary members, whereby each selecting magnet is operative to select simultaneously the corresponding primary member and the corresponding secondary member.

A further object of the invention is to provide in an automatic switch of the coordinate type, improved clutch-control mechanism common to the primary bars and to the secondary bars, whereby, when any primary bar is clutched to the associated primary operating element, the corresponding secondary bar is clutched to the associated secondary operating element.

A still further object of the invention is to provide in an automatic switch of the coordinate type, an improved arrangement for testing the lines in a selected group, selected incident to the operation of the corresponding primary bar, prior to operation of any secondary bar; whereby a secondary bar corresponding to a desired line in the selected group is operated only in the event the testing arrangement tests the desired line as being selectable by the switch.

Further features of the invention pertain to the particular arrangement of the circuit elements of the system, whereby the above outlined and additional operating features thereof are attained.

Figure 2:
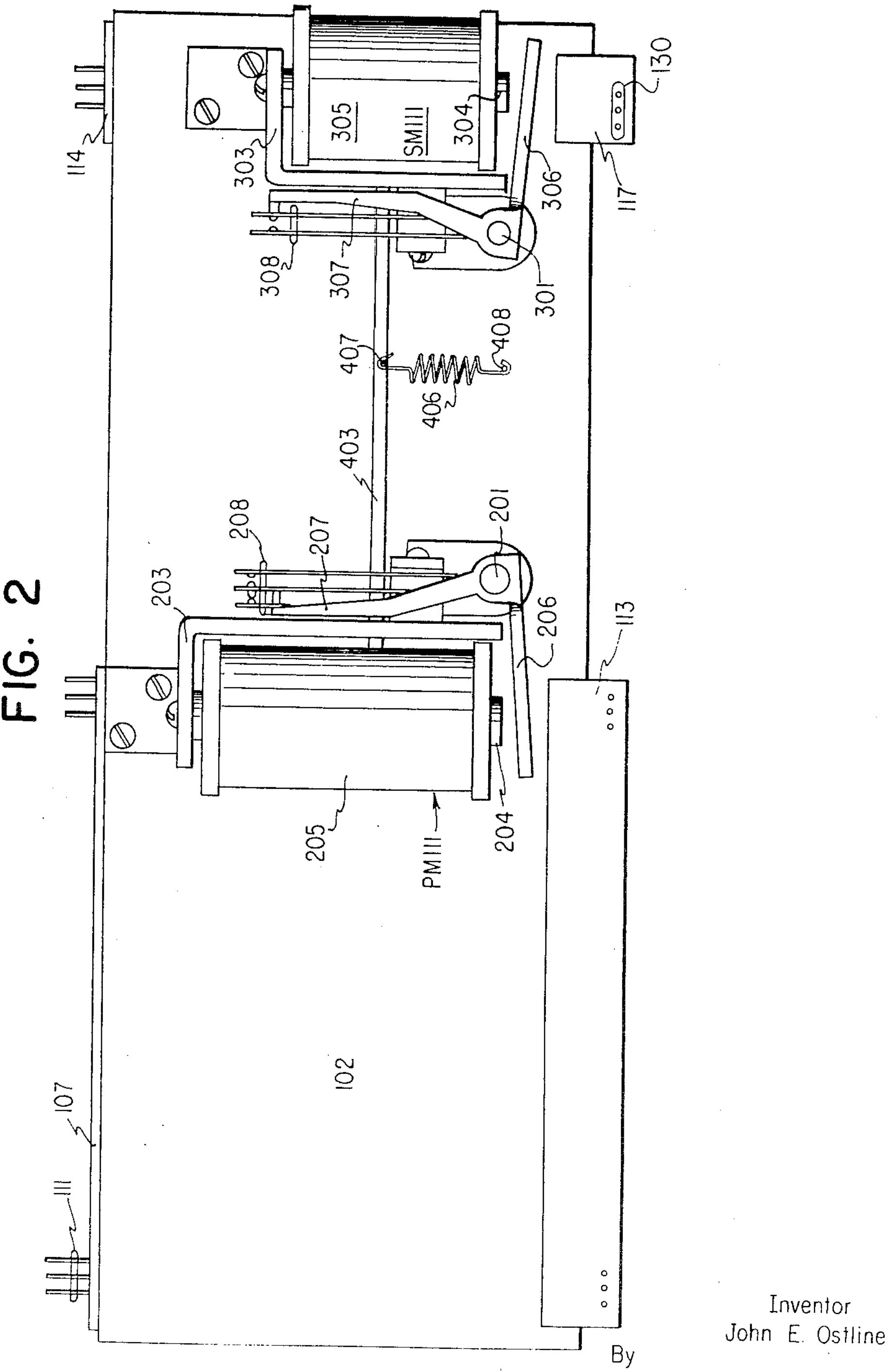
Figure 4:
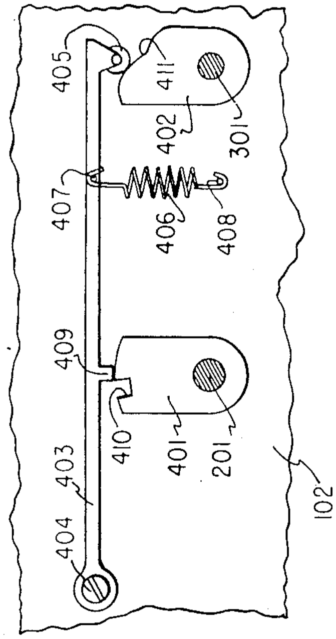
Figure 5:
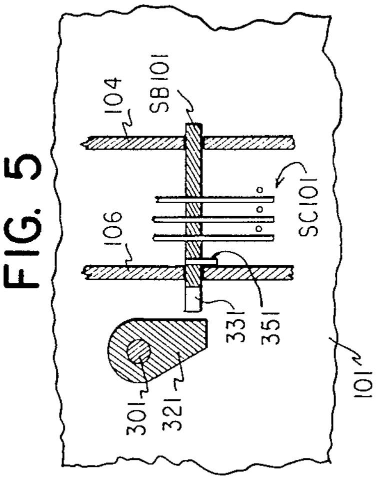
Figure 3:
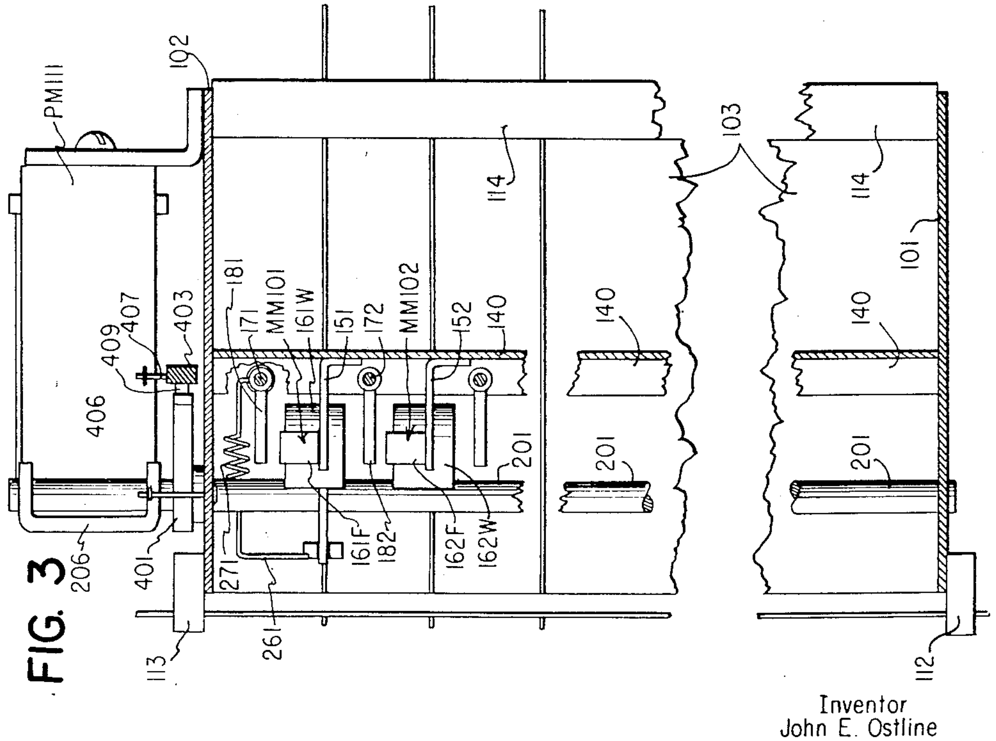
Figure 10:
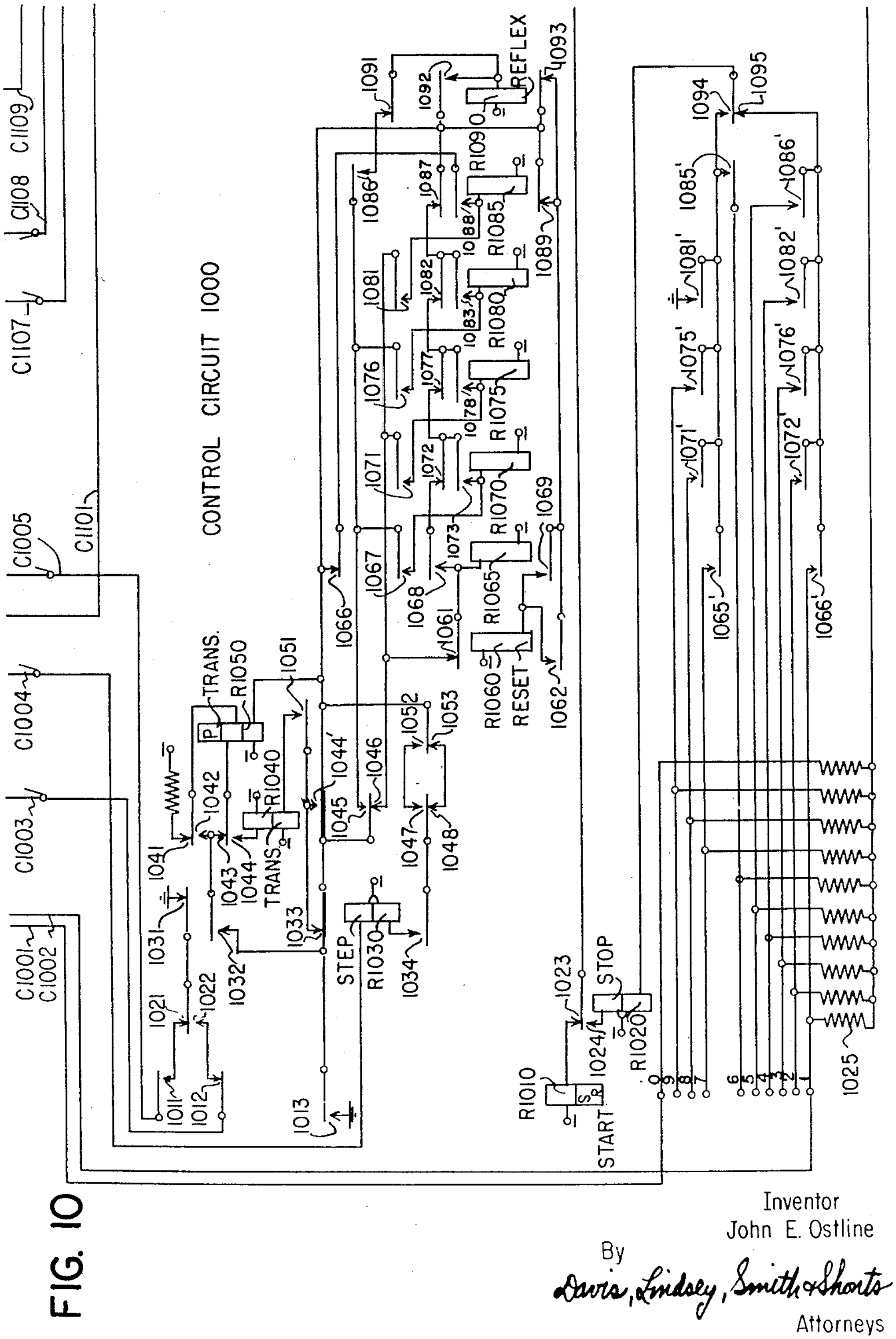
Figure 11:
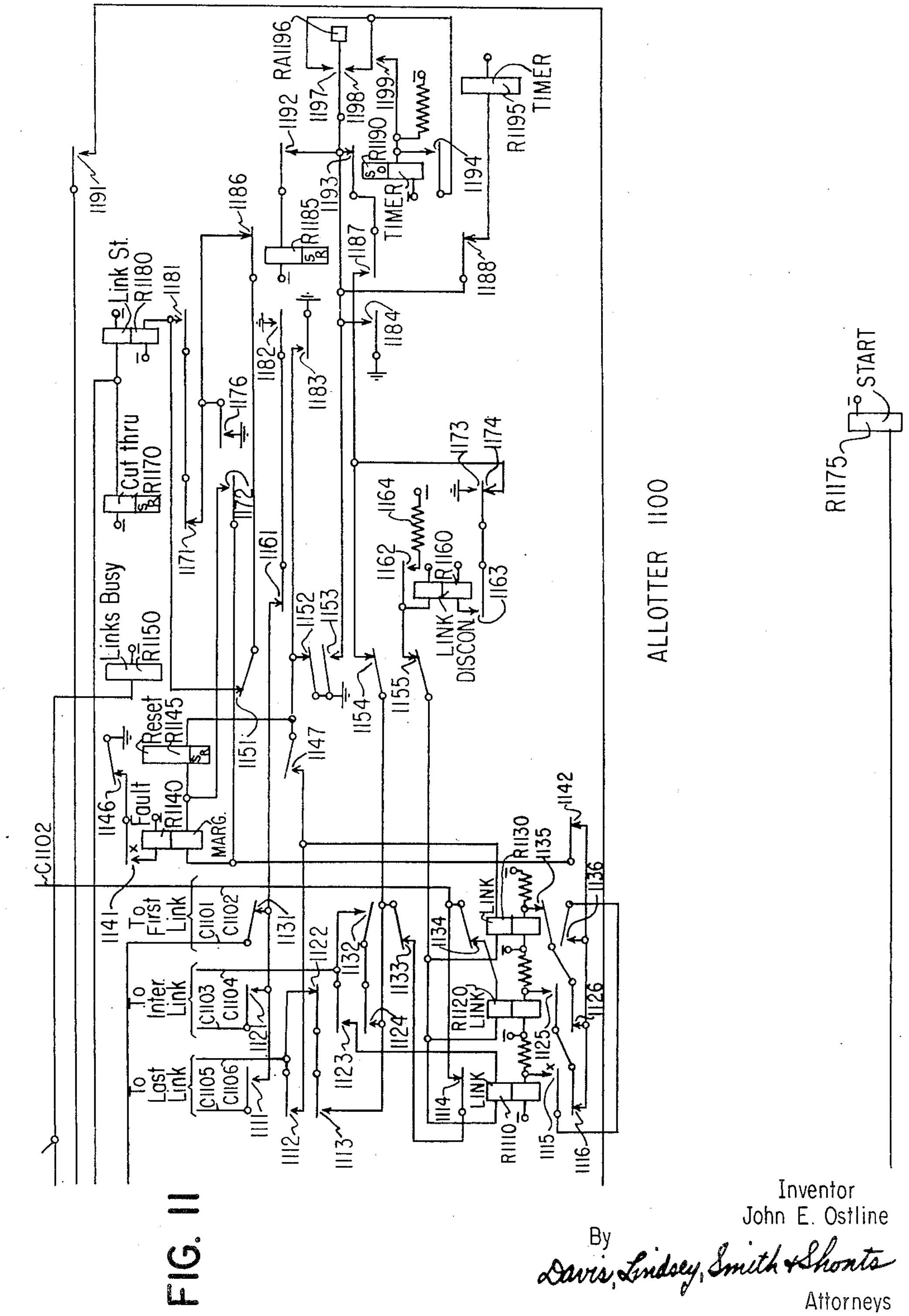

The invention, both as to its organization and method of operation, together with further objects and advantages thereof, will best be understood by reference to the following specification taken in connection with the accompanying drawings, in which Figure 1 is a fragmentary front elevational view of switching apparatus constructed and arranged in accordance with the present invention; Fig. 2 is a plan view of the switching apparatus shown in Fig. 1; Fig. 3 is a fragmentary sectional view, taken along the line 3—3 in Fig. 1, of the switching apparatus; Fig. 4 is a fragmentary sectional view, taken along the line 4—4 in Fig. 1, of the switching apparatus, illustrating a latch arrangement cooperating between primary and secondary operating elements thereof; Fig. 5 is a fragmentary sectional view, taken along the line 5—5 in Fig. 1, of the switching apparatus, illustrating a clutch arrangement cooperating between the secondary operating element and a first secondary bar thereof; and Figs. 6 to 11, inclusive, taken together, illustrate the details of a complete automatic telephone system having incorporated therein switching apparatus of the character of that shown in Figs. 1 to 5, inclusive. More particularly, Figs. 6, 7, 8 and 9 should be arranged from left to right in end-to-end relation; and Figs. 10 and 11 should be arranged from left to right in end-to-end relation and disposed, respectively, below Figs. 6 and 7 in order to form a unified diagram.

Figure 6:
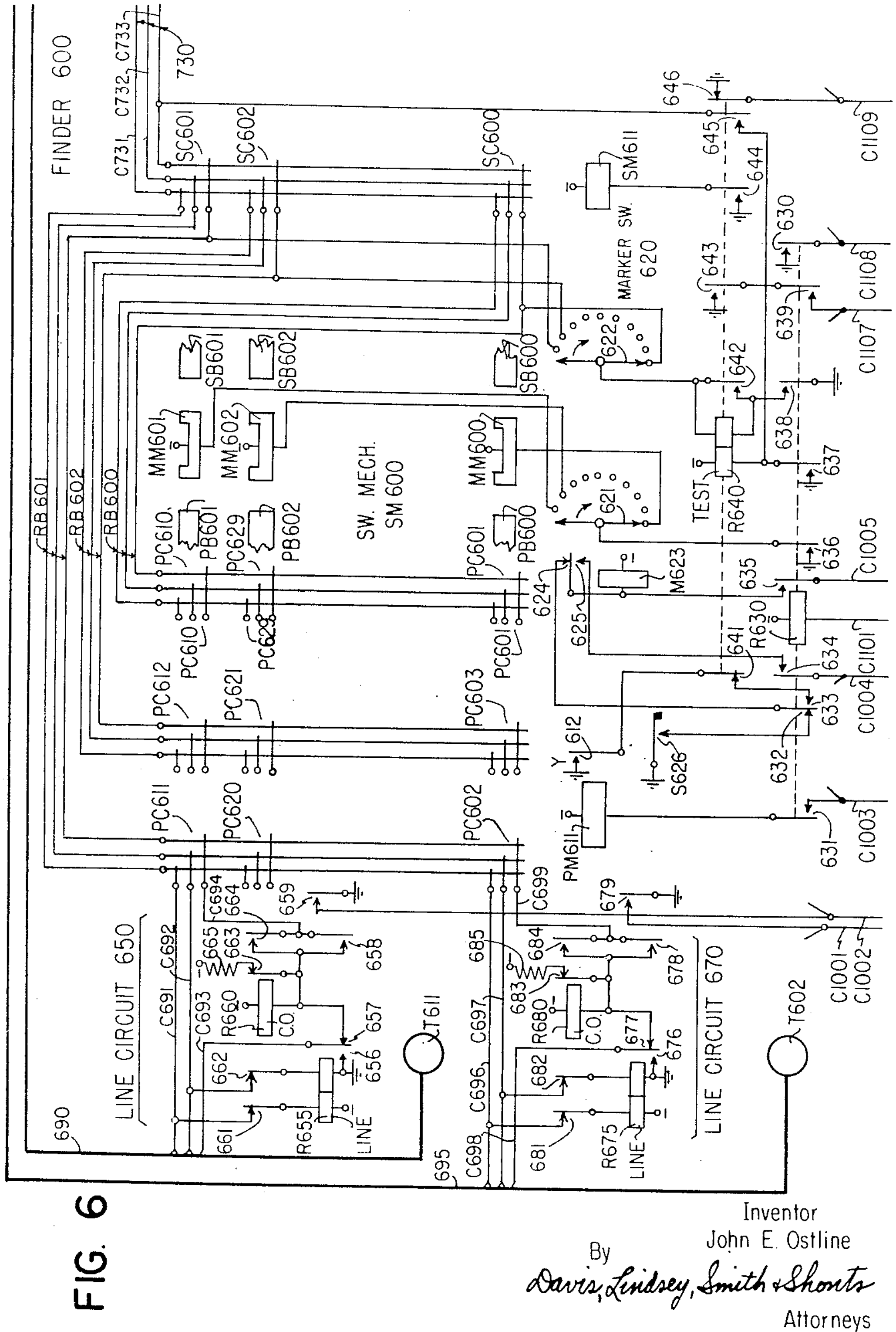

Referring now, more particularly, to Figs. 6 to 11, inclusive, of the drawings, there is illustrated an automatic telephone system comprising an exchange terminating 1000 subscriber lines, including the subscriber lines 690 and 695 respectively extending to subscriber substations T611 and T602. Each subscriber line is provided with a line circuit individual thereto; the line circuits 650 and 670 being respectively individual to the subscriber lines 690 and 695, as shown in Fig. 6. Also, the system comprises switching apparatus, including ten groups of finder-selector links; the second group including the first finder-selector link illustrated, which comprises the finder 600, shown in Fig. 6, and the selector 700, shown in Fig. 7. Also, the switching apparatus comprises ten groups of connectors, each including ten individual connectors; the ninth individual connector 800 in the second group being shown in Figs. 8 and 9. Moreover, the system comprises a control circuit and an allotter individual to each group of finder-selector links; the control circuit 1000 and the allotter 1100, respectively shown in Figs. 10 and 11, being individually associated with the second group of finder-selector links, including the first link illustrated. Each group of finder-selector links serves a corresponding group of 100 of the subscriber lines; and each group of connectors serves a corresponding group of 100 of the subscriber lines. Specifically, the second group of finder-selector links, including the first link illustrated, serves the second 100 line group of subscriber lines; and the second group of connectors, including the ninth connector 800 illustrated, serves the second group of 100 subscriber lines.

Preferably, the line circuits are identical; the line circuit 650 and 670 respectively comprising, as shown in Fig. 6, line relays R655 and R675, and cut-offs relays R660 and R680; and are connected and arranged in a manner more fully explained hereinafter.

Preferably, each of the links is identical to that illustrated, comprising the finder 600 and the selector 700. The finder 600, shown in Fig. 6, comprises a switch mechanism SM600; and a relay group including a start relay R630 and a test relay R640; as well as a selecting device or marker switch 620 of the forward-stepping rotary type; and is connected and arranged in a manner more fully explained hereinafter. The switch mechanism SM600 is identical to that shown in Figs. 1 to 5, inclusive, and described hereinafter; and comprises, among other elements, ten marking magnets MM601 to MM600, inclusive; ten primary members or bars PB601 to PB600, inclusive; a primary magnet PM611; ten secondary members or bars SB601 to SB600, inclusive; a secondary magnet S611; one hundred primary contact sets PC611 to PC600, inclusive, and ten secondary contact sets SC601 to SC600, inclusive.

More particularly, in the switch mechanism SM600, the ten secondary contact sets SC601 to SC600, inclusive, are respectively associated with the ten secondary bars SB601 to SB600, inclusive; whereas, the one hundred primary contact sets PC611 to PC600, inclusive, are associated with the ten primary bars PB601 to PB600, inclusive, in the manner indicated below:

| Primary Bars | Disposition of the Primary Contact Sets (Left to Right) |
|---|---|
| PB601 | PC611, PC612, etc., and PC610. |
| PB602 | PC620, PC621, etc., and PC629. |
| PB603 | PC639, PC630, etc., and PC638. |
| PB604 | PC648, PC649, etc., and PC647. |
| PB605 | PC657, PC658, etc., and PC656. |
| PB606 | PC666, PC667, etc., and PC665. |
| PB607 | PC675, PC676, etc., and PC674. |
| PB608 | PC684, PC685, etc., and PC683. |
| PB609 | PC693, PC694, etc., and PC692. |
| PB600 | PC602, PC603, etc., and PC601. |

Finally, the switch mechanism SM600 comprises ten riser busses RB601 to RB600, inclusive, respectively terminating in the ten secondary contact sets SC601 to SC600, inclusive. Further, each of the ten riser busses RB601 to RB600, inclusive, terminates in ten of the primary contact sets respectively disposed in the ten groups of primary contact sets. For examples, the riser bus RB601 terminates in the ten primary contact sets PC611, PC620, etc., and PC602; the riser bus RB602 terminates in the ten primary contact sets PC612, PC621, etc., and PC603; and the riser bus RB600 terminates in the ten primary contact sets PC610, PC629, etc., and PC601.

In the finder 600, the marker switch 620 is of the forward-stepping rotary type, as previously noted, and comprises two double-ended wipers 621 and 622 provided with individually associated contact banks, each including ten individual contacts; and a magnet M623 for driving the wipers noted step by step in the clockwise direction. Also, associated with the marker switch 620 is a set of switch springs S626, which is actuated when the wipers noted are driven away from their home positions, wherein they engage the tenth contacts in the associated contact banks.

Figure 7:
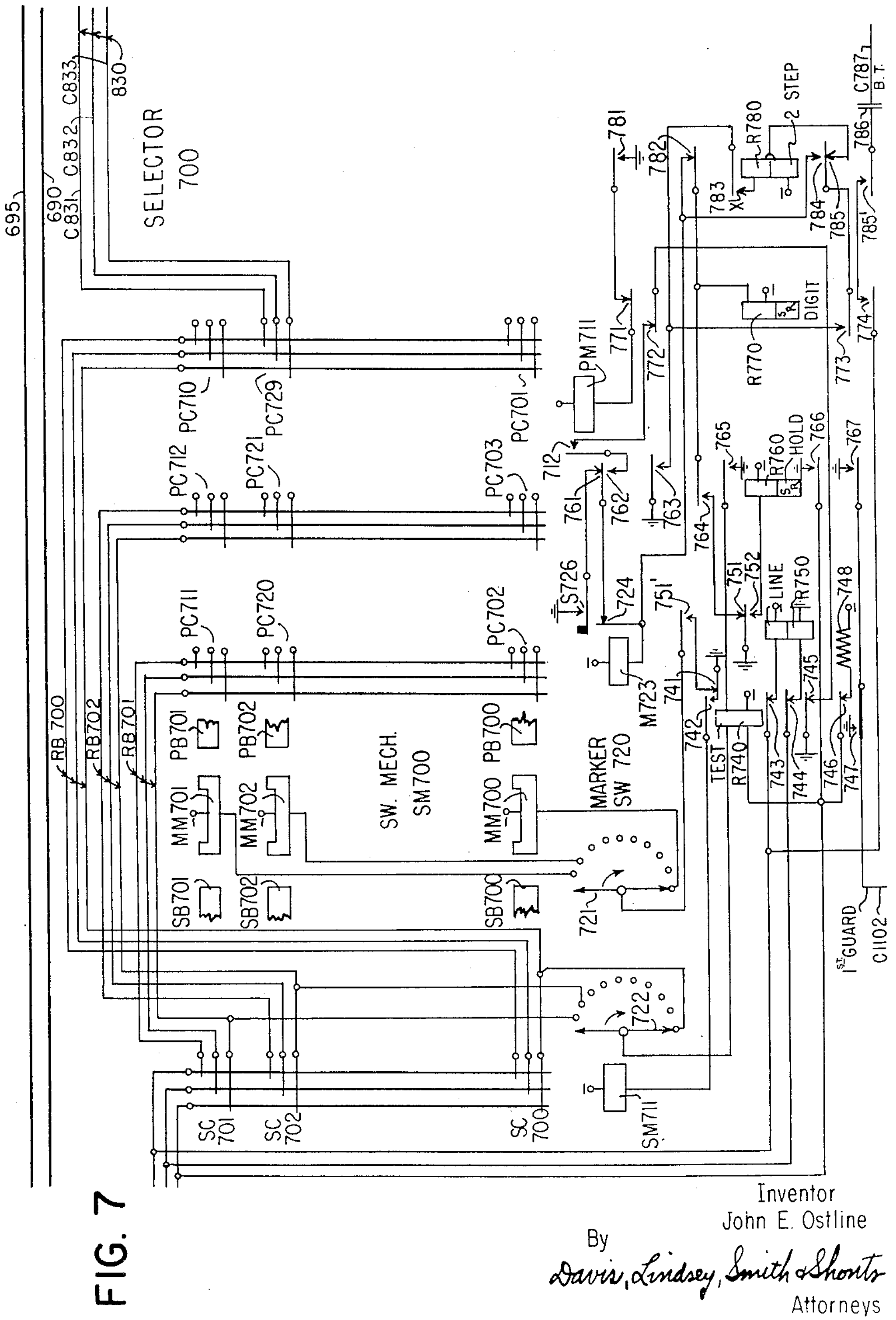

The selector 700, shown in Fig. 7, comprises a switch mechanism SM700; and a relay group including a test relay R740, a line relay R750, a hold relay R760, a digit relay R770 and a control relay R780; as well as a selecting device or marker switch 720 of the forward-stepping rotary type; and is connected and arranged in a manner more fully explained hereinafter. The switch mechanism SM700 is substantially identical to that shown in Figs. 1 to 5, inclusive, and described hereinafter; and comprises, among other elements, ten marking magnets MM701 to MM700, inclusive; ten primary members or bars PB701 to PB700, inclusive; a primary magnet PM711; ten secondary members or bars SB701 to SB700, inclusive; a secondary magnet SM711; one hundred primary contact sets PC711 to PC700, inclusive; and ten secondary contact sets SC701 to SC700, inclusive.

More particularly, in the switch mechanism SM700, the ten secondary contact sets SC701 to SC700, inclusive, are respectively associated with the ten secondary bars SB701 to SB700, inclusive; whereas, the one hundred primary contact sets PC711 to PC700, inclusive, are associated with the ten primary bars PB701 to PB700, inclusive, in the manner indicated below:

| Primary Bars | Disposition of the Primary Contact Sets (Left to Right) |
|---|---|
| PB701 | PC711, PC712, etc., and PC710 |
| PB702 | PC720, PC721, etc., and PC729 |
| PB703 | PC739, PC730, etc., and PC738 |
| PB704 | PC748, PC749, etc., and PC747 |
| PB705 | PC757, PC758, etc., and PC756 |
| PB706 | PC766, PC767, etc., and PC765 |
| PB707 | PC775, PC776, etc., and PC774 |
| PB708 | PC784, PC785, etc., and PC783 |
| PB709 | PC793, PC794, etc., and PC792 |
| PB700 | PC702, PC703, etc., and PC701 |

Finally, the switch mechanism SM700 comprises ten riser busses RB701 to RB700, inclusive, respectively terminating in the ten secondary contact sets SC701 to SC700, inclusive. Further, each of the ten riser busses RB701 to RB700, inclusive, terminates in ten of the primary contact sets respectively disposed in the ten groups of primary contact sets. For examples, the riser bus RB701 terminates in the ten primary contact sets PC711, PC720, etc., and PC702; the riser bus RB702 terminates in the ten primary contact sets PC712, PC721, etc., and PC703; and the riser bus RB700 terminates in the ten primary sets PC710, PC729, etc., and PC701.

In the finder 700, the marker switch 720 is of the forward-stepping rotary type, as previously noted, and comprises two double-ended wipers 721 and 722 provided with individually associated contact blanks, each including ten individual contacts; and a magnet M723 for driving the wipers noted step by step in the clockwise direction. Also, associated with the marker switch 720 is a set of switch springs S726, which is actuated when the wipers noted are driven away from their home positions, wherein they engage the tenth contacts in the associated contact banks.

Figure 8:
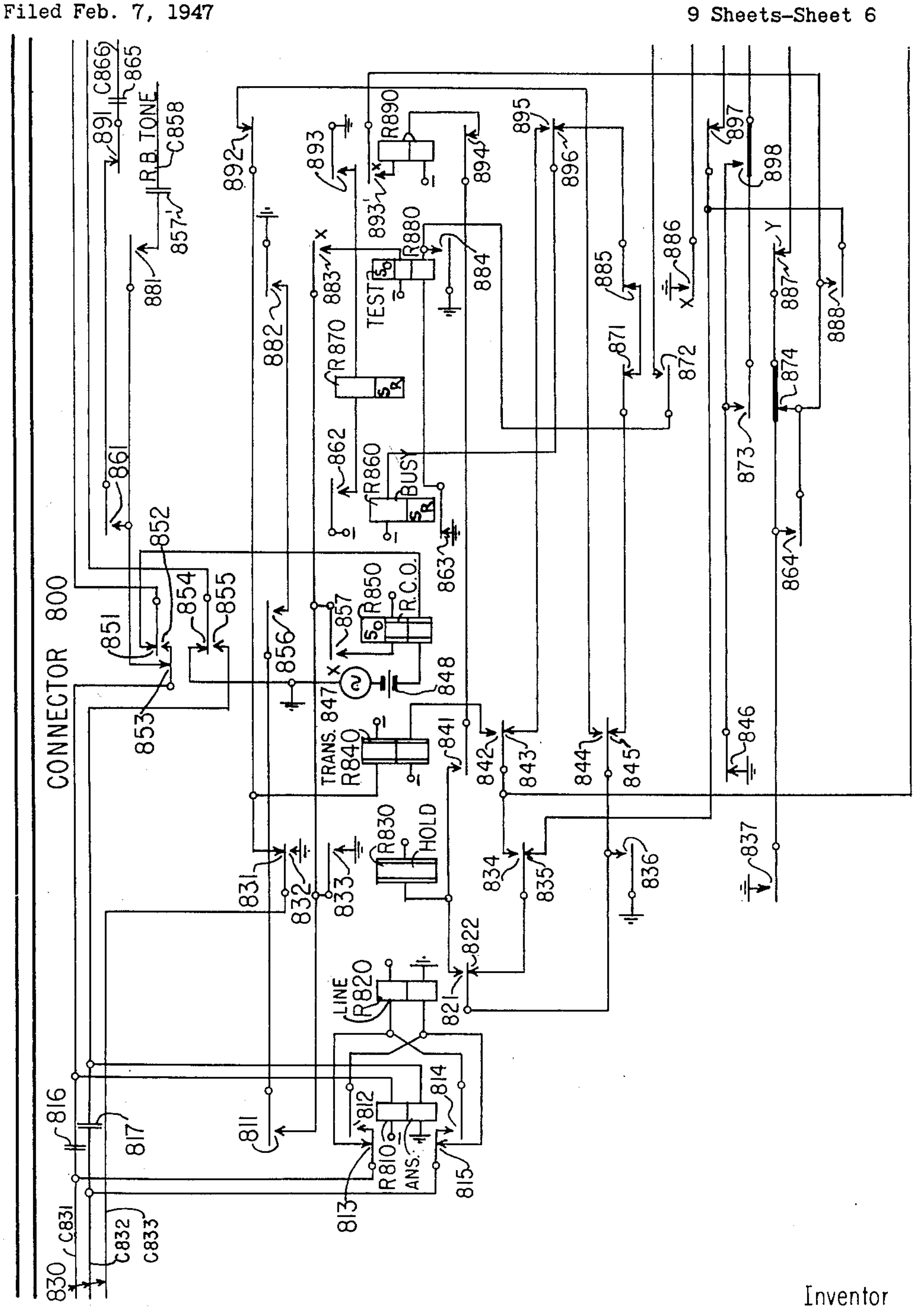
Figure 9:
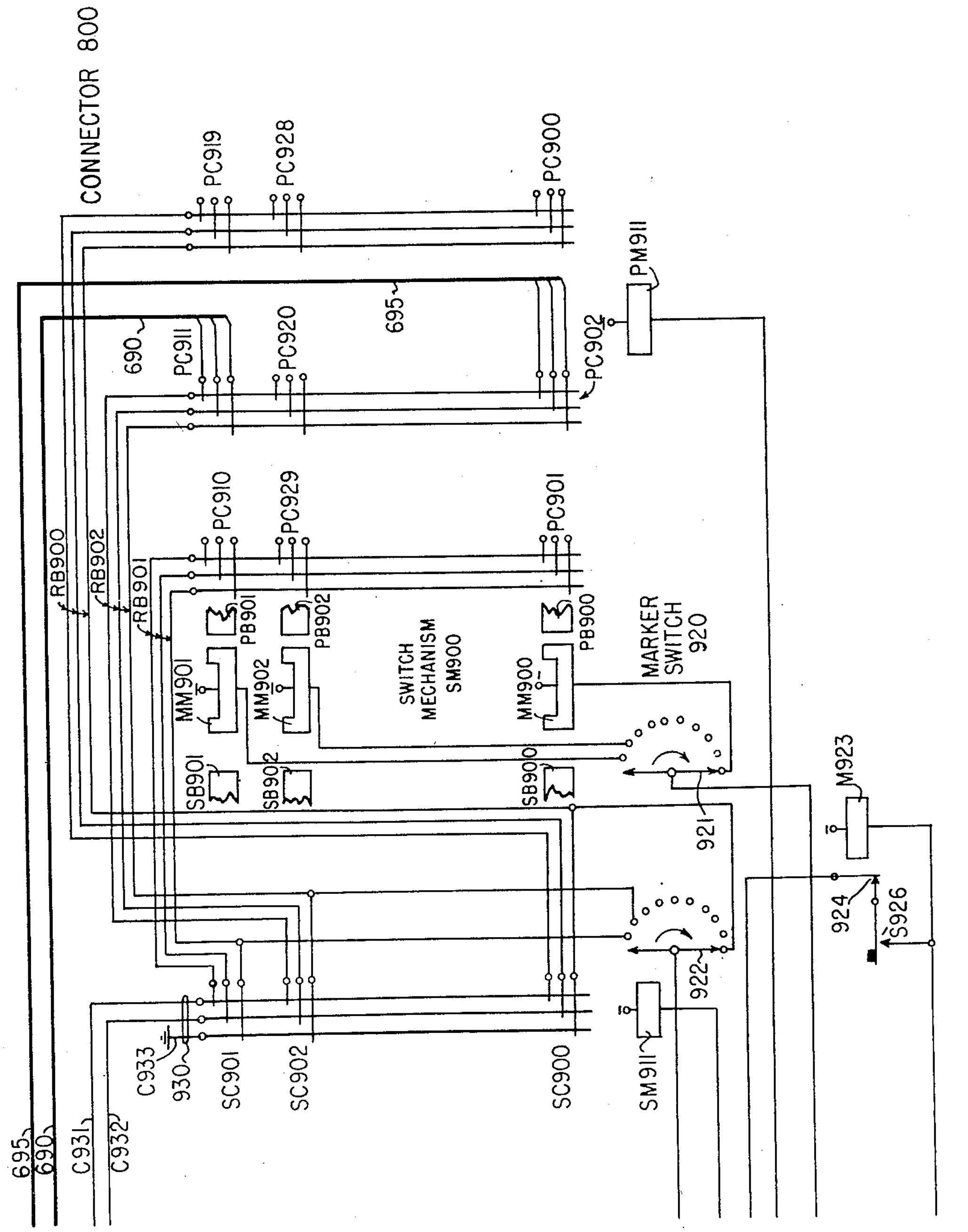

Preferably, each of the connectors is identical to the connector 800, shown in Figs. 8 and 9, that comprises a switch mechanism SM900; and a relay group including an answer relay R810, a line relay R820, a hold relay R830, a transfer relay R840, a ring cut-off relay R850, a busy relay R860, a test relay R880 and two control relays R870 and R890; as well as a selecting device or marker switch 920 of the forward-stepping rotary type; and is connected and arranged in a manner more fully explained hereinafter. The switch mechanism SM900 is substantially identical to that shown in Figs. 1 to 5, inclusive, and described hereinafter; and comprises, among other elements, ten marking magnets MM901 to MM900, inclusive; ten primary members or bars PB901 to PB900, inclusive, a primary magnet PM911; ten secondary members or bars SB901 to SB900, inclusive, a secondary magnet SM911; one hundred primary contact sets PC911 to PC900, inclusive; and ten secondary contact sets SC901 to SC900, inclusive.

More particularly, in the switch mechanism SM900, the ten secondary contact sets SC901 to SC900, inclusive, are respectively associated with the ten secondary bars SB901 to SB900, inclusive; whereas the one hundred primary contact sets PC910 to PC900, inclusive, are associated with the ten primary bars PB901 to PB900, inclusive, in the manner indicated below:

| Primary Bars | Disposition of the Primary Contact Sets (Left to Right) |
|---|---|
| PB901 | PC910, PC911, etc., and PC919 |
| PB902 | PC929, PC920, etc., and PC928 |
| PB903 | PC938, PC939, etc., and PC937 |
| PB904 | PC947, PC948, etc., and PC946 |
| PB905 | PC956, PC957, etc., and PC955 |
| PB906 | PC965, PC966, etc., and PC964 |
| PB907 | PC974, PC975, etc., and PC973 |
| PB908 | PC983, PC984, etc., and PC982 |
| PB909 | PC992, PC993, etc., and PC991 |
| PB900 | PC901, PC902, etc., and PC900 |

Finally, the switch mechanism SM900 comprises ten riser busses, RB901 to RB900, inclusive, respectively terminating in the ten secondary contact sets SC901 to SC900, inclusive. Further, each of the ten riser busses RB901 to RB900, inclusive, terminates in the ten primary contact sets respectively disposed in the ten groups of primary contact sets. For examples, the riser bus RB901 terminates in the ten primary contact sets PC910, PC929, etc., and PC901; the riser bus RB902 terminates in the ten primary contact sets PC911, PC920, etc., and PC902; and the riser bus RB900 terminates in the ten primary contact sets PC919, PC928, etc., and PC900.

In the connector 800, the marker switch 920 is of the forward-stepping rotary type, as previously noted, and comprises two double-ended wipers 921 and 922 provided with individually associated contact banks, each including ten individual contacts; and a magnet M923 for driving the wipers noted step by step in the clockwise direction. Also, associated with the marker switch 920, is a set of switch springs S926, which is actuated when the wipers noted are driven away from their home positions, wherein they engage the tenth contacts in the associated contact banks.

The control circuit 1000 is commonly associated with the finder-selector links in the second group and comprises a relay group including a start relay R1010, a stop relay R1020, a step relay R1030, two transfer relays R1040 and R1050, a reset relay R1060, five counting relays R1065, R1070, R1075, R1080 and R1085, and a reflex relay R1090; and is connected and arranged in a manner more fully explained hereinafter.

The allotter 1100 is commonly associated with the finder-selector links in the second group and comprises a relay group including a plurality of link relays respectively corresponding to the finder-selector links in this group; the link relay R1130 being individual to the first finder-selector link illustrated in this group, and the link relays R1120 and R1110 being respectively individual to an intermediate link, not shown, in this group, and to the last link, not shown, in this group; a fault relay R1140; a reset relay R1145; a links-busy relay R1150; a link disconnect relay R1160; a cut-through relay R1170; a start relay R1175; a link start relay R1180; a control relay R1185; and two timer relays R1190 and R1195; all connected and arranged in a manner more fully described hereinafter.

*Construction and operation of the switch mechanism*

As previously noted, each of the finders 600, etc., selectors 700, etc., and connectors 800, etc., comprises a switch mechanism substantially identical to that shown in Figs. 1 to 5, inclusive. Referring now, more particularly, to Figs. 1 to 5, inclusive, the switch mechanism SM100 there illustrated, comprises a frame including a bottom plate 101, a top plate 102, two upstanding end plates 103 and 104, and two upstanding intermediate plates 105 and 106, suitably secured together. The intermediate plate 105 is disposed in substantially parallel spaced-apart relation with respect to the end plate 103 and cooperates therewith to support ten horizontally extending, slidably mounted, primary members or bars, PB101 to PB100, inclusive, formed of insulating material and arranged in substantially parallel spaced-apart relation. Similarly, the intermediate plate 106 is disposed in substantially parallel spaced-apart relation with respect to the end plate 104 and cooperates therewith to support ten horizontally extending, slidably mounted, secondary members or bars SB101 to SB100, inclusive, formed of insulating material and arranged in substantially parallel spaced-apart relation. More particularly, the ten primary bars PB101 to PB100, inclusive, are arranged respectively in axial alignment with respect to the ten secondary bars SB101 to SB100, inclusive; each primary bar PB101, etc., being slidably supported in a pair of aligned slots formed in the end plate 103 and in the intermediate plate 105, respectively; and each secondary bar SB101, etc., being slidably supported in a pair of aligned slots formed in the end plate 104 and in the intermediate plate 106, respectively.

The rear opening formed in the frame and defined by the bottom plate 101, the top plate 102, the end plate 103 and the intermediate plate 105, is closed by an upstanding plate of insulating material 107 constituting a terminal block carrying ten groups of substantially horizontally disposed and vertically spaced-apart, bare-wire, conductor sets. Each group of conductor sets comprises ten individual conductor sets; and each individual conductor set comprises at least three individual conductors, including a positive line conductor, a negative line conductor and a control conductor; one of the conductor sets being indicated at 111. Thus, it will be understood that the terminal block 107 is adapted to terminate 100 subscriber lines of the three-conductor type, arranged in ten groups of ten lines each. The ten groups of conductor sets project forwardly from the terminal block 107 and are respectively imbedded in the ten primary bars PB101 to PB100, inclusive. For example, the first group of conductor sets, including the individual conductor set 111, project forwardly from the terminal block 107 and are imbedded in the first primary bar PB101. Also, the bottom plate 101 and the top plate 102 respectively carry forwardly projecting strips of insulating material 112 and 113, which support ten vertically disposed, bare-wire, riser busses RB101 to RB100, inclusive; each comprising three individual conductors, including a positive line conductor, a negative line conductor and a control conductor. The individual conductors of the ten riser busses RB101 to RB100, inclusive, are arranged in interspersed relation with respect to the outer ends of the individual conductors of the conductor sets imbedded in the ten primary bars PB101 to PB100, inclusive, and normally out-of-contact therewith. More specifically, the ten riser busses RB101 to RB100, inclusive, are disposed slightly inwardly with respect to the outer ends of the one hundred conductor sets 111, etc., imbedded in the ten primary bars PB101 to PB100, inclusive; and the individual conductors of each riser bus RB101, etc., are positioned slightly to the left of the respective individual conductors of the ten cooperating conductor sets 111, etc., imbedded in the ten primary bars PB101, etc. More particularly, the ten conductor sets 111, etc., imbedded in each primary bar PB101, etc., respectively cooperate with the ten riser busses RB101, etc.; whereby each group of ten conductor sets comprises one individual conductor set cooperating with each riser bus RB101, etc.

In view of the foregoing description of the arrangement of the one hundred conductor sets 111, etc., and the ten riser busses RB101 to RB100, inclusive, it will be understood that when any one of the primary bars PB101, etc. is moved from its normal position toward the left, the ten conductor sets 111, etc., imbedded therein are moved into respective engagements with the ten riser busses RB101 to RB100, inclusive. Accordingly, each of the ten riser busses RB101, etc., comprises ten intersections with ten corresponding ones of the conductor sets 111, etc.; which intersections are referred to as primary contact sets. Thus, each primary bar PB101, etc., corresponds to ten primary contact sets arranged in a group; and each riser bus RB101, etc., corresponds to ten primary contact sets respectively disposed in the ten groups of primary contact sets. For example, the first primary bar PB101 corresponds to the first group of ten primary contact sets, including the primary contact sets PC111, etc., and PC110; and the first riser bus RB101 corresponds to the ten primary contact sets, including the primary contact sets PC111, PC120, etc., respectively disposed in the ten groups of primary contact sets.

The rear opening formed in the frame and defined by the bottom plate 101, the top plate 102, the end plate 104 and the intermediate plate 106, is closed by an upstanding plate of insulating material 114, constituting a terminal block carrying ten substantially horizontally disposed and vertically spaced-apart, bare-wire conductor sets. Each conductor set comprises three individual conductors, including a positive line conductor, a negative line conductor and a control conductor; one of the conductor sets being indicated at 115. The ten conductor sets project forwardly from the terminal block 114 and are respectively imbedded in the ten secondary bars SB101 to SB100, inclusive. For example, the first conductor set 115 projects forwardly from the terminal block 114 and is imbedded in the first secondary bar SB101. Also, the bottom plate 101 and the top plate 102 respectively carry forwardly projecting strips of insulating material 116 and 117, which support a vertically disposed, bare-wire, trunk 130; the trunk 130 comprising three individual conductors, including a positive line conductor, a negative line conductor and a control conductor. The individual conductors of the trunk 130 are arranged in interspersed relation with respect to the outer ends of the individual conductors of the conductor sets imbedded in the ten secondary bars SB101 to SB100, inclusive, and normally out-of-contact therewith. More specifically, the trunk 130 is disposed slightly inwardly with respect to the outer ends of the ten conductor sets 115, etc., imbedded in the ten secondary bars SB101 to SB100, inclusive; and the individual conductors of the trunk 130 are positioned slightly to the right of the respective individual conductors of the ten cooperating conductor sets 115, etc., imbedded in the ten secondary bars SB101, etc. More particularly, the conductor set 115, etc., imbedded in each of the secondary bars SB101, etc., cooperate with the trunk 130.

In view of the foregoing description of the arrangement of the ten conductor sets 115, etc., and the trunk 130, it will be understood that when any one of the secondary bars SB101, etc., is moved from its normal position toward the right, the conductor set 115, etc., imbedded therein is moved into engagement with the trunk 130. Accordingly, the trunk 130 comprises ten intersections with the ten conductor sets 115, etc.; which intersections are referred to as secondary contact sets. Thus, each secondary bar SB101, etc., corresponds to one secondary contact set; and the trunk 130 corresponds to the ten secondary contact sets. For example, the first secondary bar SB101 corresponds to the first secondary contact set SC101; and the trunk 130 corresponds to the ten secondary contact sets, including the secondary contact sets SC101, SC102, SC103, etc.

As previously noted, the one hundred conductor sets 111, etc., carried by the terminal block 107 terminate one hundred subscriber lines; and any group of ten of the conductor sets may be selectively connected to the ten riser busses RB101 to RB100, inclusive. The ten riser busses RB101 to RB100, inclusive, are respectively connected to the ten conductor sets 115, etc., carried by the terminal block 114. For example, the first riser bus RB101 is connected to the first conductor set 115 imbedded in the first secondary bar SB101. Accordingly, the ten riser busses RB101 to RB100, inclusive, may be selectively connected to the trunk 130. Since each riser bus corresponds to ten individual primary contact sets respectively disposed in the ten groups of primary contact sets, and is, in turn, terminated in one of the secondary contact sets in the group of ten secondary contact sets; it follows that each individual secondary contact set corresponds to ten individual primary contact sets respectively disposed in the ten groups of primary contact sets. Recapitulating, each primary bar PB101, etc., corresponds to a group of ten primary contact sets PC111, etc.; and each of the secondary bars SB101, etc., corresponds to ten individual primary contact sets PC111, etc., respectively disposed in the ten groups of primary contact sets. In view of the foregoing description of the switching apparatus 100, it will be understood that any group of ten of the subscriber lines terminating in the terminal block 107 may be selected by operating the corresponding one of the primary bars; and that then any one of the individual subscriber lines in the previously selected group of ten subscriber lines may be selected therefrom by operating the corresponding one of the secondary bars.

In the switch mechanism SM100 the space formed in the frame and defined by the bottom plate 101, the top plate 102 and the intermediate plates 105 and 106, accommodates an upstanding channel-shaped member 140 secured in place between the bottom plate 101 and the top plate 102, and provided with forwardly projecting flanges 141 and 142 suitably spaced from the respectively associated intermediate plates 105 and 106. The member 140 carries ten vertically spaced-apart, substantially L-shaped, brackets 151, 152, etc., projecting forwardly therefrom, and disposed between the flanges 141 and 142. The ten brackets 151, 152, etc., carry ten selecting or marking magnets MM101, MM102, etc., respectively, arranged between and forwardly of the flanges 141 and 142. Each of the marking magnets MM101, MM102, etc., is provided with a magnetic field element and an associated winding; the marking magnet MM101 being provided with a field element 161F and an associated winding 161W. Ten substantially horizontally extending and vertically spaced-apart rods 171, 172, etc., are journaled in pairs of aligned openings formed in the flanges 141 and 142, and respectively carry ten magnetic armatures 181, 182, etc., respectively cooperating with the field element 161F, etc., of the respective marking magnets MM101, etc. Ten coil springs 191, 192, etc., respectively surround the rods 171, 172, etc.; and are respectively secured between the flange 141 and the associated armatures 181, etc.; whereby the armatures 181, etc., are biased in the clockwise direction, as viewed in Fig. 3, away from the associated field elements 161F, etc., of the respective marking magnets MM101, etc. In view of the foregoing description of the marking magnets MM101, etc., it will be understood that when the windings 161W, etc., thereof are energized, the associated field elements 161F, etc., thereof attract the associated armatures 181, etc., in order to cause rotation of the respective rods 171, etc., in the counterclockwise direction, as viewed in Fig. 3, against the bias of the associated coil springs 191, etc. When the windings 161W, etc., are deenergized the associated armatures 181, etc., are released and returned by the associated coil springs 191, etc., in the clockwise direction, as viewed in Fig. 3, back into their normal positions.

Further, the switch mechanism SM100 comprises a vertically disposed primary operating element 201 journaled in a pair of aligned openings formed in the bottom plate 101 and in the top plate 102, the primary operating element being arranged between the intermediate plate 105 and the flange 141 and projecting above the top plate 102; and a vertically disposed secondary operating element 301 journaled in a pair of aligned openings formed in the bottom plate 101 and in the top plate 102, the secondary operating element being arranged between the intermediate plate 106 and the flange 142 and projecting above the top plate 102. The primary operating element 201 is supported by a step-bearing element 202 rigidly secured thereto and engaging the top plate 102; and is operatively associated with a primary magnet PM111 carried by the top plate 102. More particularly, the primary magnet PM111 comprises a magnetic heel-piece 203 secured directly to the top plate 102, a magnetic core 204 supporting a winding 205, and a magnetic armature 206 rigidly secured to the upper end of the primary operating element 201. The armature 206 is provided with a rearwardly extending arm 207 that cooperates with a set of resilient switch springs 208 secured to the magnetic heel-piece 203; which set of switch springs 208 biases the arm 207, and consequently the armature 206, away from the end of the core 204, thereby biasing the primary operating element 201 in the counterclockwise direction, as viewed in Fig. 2. It will be understood that when the winding 205 of the primary magnet PM111 is energized the core 204 will attract the armature 206 rotating the primary operating element 201 in the clockwise direction, as viewed in Fig. 2, against the bias of the set of switch springs 208 engaging the arm 207; whereby the set of switch springs 208 is operated. Subsequently, when the winding 205 is deenergized the armature 206 will be released by the core 204 and the primary operating element 201 will be rotated in the counterclockwise direction, as viewed in Fig. 2, back into its home position by the set of switch springs 208 acting upon the arm 207; whereby the set of switch springs 208 will be restored.

Similarly, the secondary operating element 301 is supported by a step-bearing element 302 rigidly secured thereto and engaging the top plate 102; and is operatively associated with a secondary magnet SM111 carried by the top plate 102. More particularly, the secondary magnet SM111 comprises a magnetic heel-piece 303 secured directly to the top plate 102, a magnetic core 304 supporting a winding 305, and a magnetic armature 306 rigidly secured to the upper end of the second operating element 301. The armature 306 is provided with a rearwardly extending arm 307 that cooperates with a set of resilient switch springs 308 secured to the magnetic heel-piece 303; which set of switch springs 308 biases the arm 307, and consequently the armature 306, away from the end of the core 304, thereby biasing the secondary operating element 301 in the clockwise direction, as viewed in Fig. 2. It will be understood that when the winding 305 of the secondary magnet SM111 is energized the core 304 will attract the armature 306 rotating the secondary operating element 301 in the counterclockwise direction, as viewed in Fig. 2, against the bias of the set of switch springs 308 engaging the arm 307; whereby the set of switch springs 308 is operated. Subsequently, when the winding 305 is deenergized, the armature 306 will be released by the core 304 and the secondary operating element 301 will be rotated in the clockwise direction, as viewed in Fig. 2, back into its home position by the set of switch springs 308 acting upon the arm 307; whereby the set of switch springs 308 will be restored.

The primary operating element 201 carries ten vertically spaced-apart operating lugs 221, 222, etc., respectively disposed in alignment with the ten primary bars PB101, PB102, etc. More particularly, the primary bars PB101, PB102, etc., have notches or slots 231, 232, etc., respectively formed in the extreme right-hand ends thereof into which the lugs 221, 222, etc., are adapted respectively to enter when the primary operating element 201 is rotated in the clockwise direction, as viewed in Fig. 2; whereby the primary operating element 201 does not normally exert any thrust upon the primary bars PB101, PB102, etc., incident to rotation thereof in the clockwise direction, as noted above. It is pointed out that the primary bars PB101, PB102, etc., are normally urged to the right by leaf springs 241, 242, etc., secured to the end plate 103 and engaging the extreme left-hand ends thereof; and that the normal positions of the primary bars PB101, PB102, etc., are established by pins 251, 252, etc., respectively carried thereby and normally engaging the intermediate plate 105. Similarly, the secondary operating element 301 carries ten vertically spaced-apart operating lugs 321, 322, etc., respectively disposed in alignment with the ten secondary bars SB101, SB102, etc. More particularly, the secondary bars SB101, SB102, etc., have notches or slots 331, 332, etc., respectively formed in the extreme left-hand ends thereof into which the lugs 321, 322, etc., are adapted respectively to enter when the secondary operating element 301 is rotated in the counterclockwise direction, as viewed in Fig. 2; whereby the secondary operating element 321 does not normally exert any thrust upon the secondary bars SB101, SB102, etc., incident to rotation thereof in the counterclockwise direction, as noted above. It is pointed out that the secondary bars SB101, SB102, etc., are normally urged to the left by leaf springs 341, 342, etc., secured to the end plate 104 and engaging the extreme right-hand ends thereof; and that the normal positions of the secondary bars SB101, SB102, etc., are established by pins 351, 352, etc., respectively carried thereby and normally engaging the intermediate plate 106.

The rods 171, 172, etc., carry clutch fingers 261, 262, etc., adjacent to the extreme left-hand ends thereof which are adapted to be inserted between the extreme right-hand ends of the primary bars PB101, PB102, etc., and the cooperating lugs 221, 222, etc., carried by the primary operating element 201. More particularly, the clutch fingers 261, 262, etc., are directly secured to the outer ends of coil springs 271, 272, etc.; the inner ends of the coil springs 271, 272, etc., being directly secured to the rods 171, 172, etc. Also, the rods 171, 172, etc., carry clutch fingers 361, 362, etc., adjacent to the extreme right-hand ends thereof which are adapted to be inserted between the extreme left-hand ends of the secondary bars SB101, SB102, etc., and the cooperating lugs 321, 322, etc., carried by the secondary operating element 301. More particularly, the clutch fingers 361, 362, etc., are directly secured to the outer ends of coil springs 371, 372, etc.; the inner ends of the coil springs 371, 372, etc., being directly secured to the rods 171, 172, etc.

In view of the foregoing description it will be understood that the marking magnets MM101, MM102, etc., constitute clutch mechanism for respectively clutching the primary bars PB101, PB102, etc., and the secondary bars SB101, SB102, etc. respectively to the primary operating element 201 and to the secondary operating element 301. Moreover, the primary bars PB101, PB102, etc., and the secondary bars SB101, SB102, etc., are clutched in pairs respectively to the primary operating element 201 and to the secondary operating element 301. For example, when the winding 161W of the first marking magnet MM101 is energized the associated armature 181 is attracted, rotating the rod 171 in the counterclockwise direction, as viewed in Fig. 3; whereby the clutch finger 261 is positioned between the extreme right-hand end of the first primary bar PB101 and the associated lug 221 carried by the primary operating element 201 and the clutch finger 361 is positioned between the extreme left-hand end of the first secondary bar SB101 and the associated lug 321 carried by the secondary operating element 301. At this time, in the event the primary magnet PM111 is operated, the primary operating element 201 is rotated in the clockwise direction, as viewed in Fig. 2, in the manner previously explained; whereby the operating lug 221 carried by the primary operating element 201 engages the clutch finger 261 exerting a thrust toward the left upon the first primary bar PB101 in order to operate the ten primary contact sets PC111 to PC110, inclusive, associated therewith. Also at this time, in the event the secondary magnet SM111 is operated, the secondary operating element 301 is rotated in the counterclockwise direction, as viewed in Fig. 2, in the manner previously explained; whereby the operating lug 321 carried by the secondary operating element 301 engages the clutch finger 361 exerting a thrust toward the right upon the first secondary bar SB101 in order to operate the secondary contact set SC101 associated therewith. Of course, it will be understood that when the primary operating element 201 is operated at this time, the remainder of the lugs 222, etc., carried thereby enter the cooperating slots 232, etc., formed in the extreme right-hand ends of the other primary bars, PB102, etc.; without effecting operation of these primary bars. Likewise, when the secondary operating element 301 is operated at this time, the remainder of the lugs 322, etc., carried thereby enter the cooperating slots 332, etc., formed in the extreme left-hand ends of the other secondary bars SB102, etc., without effecting operation of these secondary bars. After the primary operating element 201 is operated in the manner explained above, the winding 161W of the marking magnet MM101 may be deenergized in order to cause the armature 181 thereof to be released and the associated rod 171 to be returned to its normal position by the cooperating coil spring 191 without withdrawing the clutch finger 261 from between the extreme right-hand end of the first primary bar PB101 and the lug 221 carried by the primary operating element 201, due to the provision of the coil spring 271 between the clutch finger 261 and the rod 171. In other words, the coil spring 271 permits rotation of the associated rod 171 back into its normal position while the clutch finger 261 is held between the extreme right-hand end of the first primary bar PB101 and the lug 221 carried by the primary operating element 201. Subsequently, when the primary operating element 201 is rotated back into its home position in the manner previously explained, the clutch finger 261 is withdrawn from between the extreme right-hand end of the first primary bar PB101 and the lug 221 carried by the primary operating element 201, due to the resiliency of the coil spring 271; whereby the clutch finger 261 is returned back into its normal position in non-clutching relation with respect to the lug 221 and the cooperating first primary bar PB101. Similarly, after the secondary operating element 301 is operated in the manner explained above, the winding 161W of the marking magnet MM101 may be deenergized in order to cause the armature 181 thereof to be released and the associated rod 171 to be returned to its normal position by the cooperating coil spring 191 without withdrawing the clutch finger 361 from between the extreme left-hand end of the first secondary bar SB101 and the lug 321 carried by the secondary operating element 301, due to the provision of the coil spring 371 between the clutch finger 361 and the rod 171. In other words, the coil spring 371 permits rotation of the associated rod 171 back into its normal position while the clutch finger 361 is held between the extreme left-hand end of the first secondary bar SB101 and the lug 321 carried by the secondary operating element 301. Subsequently, when the secondary operating element 301 is rotated back into its home position, in the manner previously explained, the clutch finger 361 is withdrawn from between the extreme left-hand end of the first secondary bar SB101 and the lug 321 carried by the secondary operating element 301 due to the resiliency of the coil spring 371; whereby the clutch finger 361 is returned back into its normal position in non-clutching relation with respect to the lug 321 and the cooperating first secondary bar SB101.

In the operation of the switch mechanism SM100, it will be understood that the marking magnets MM101, MM102, etc., are operated and restored in sequence until the marking magnet finally operated corresponds to the desired group of subscriber lines; at which time the primary magnet PM111 is energized in order to operate the primary operating element 201, causing the primary bar corresponding to the desired group of subscriber lines to be operated in the manner explained above; the primary bar mentioned being clutched to the primary operating element 201 at this time by virtue of the position of the finally operated marking magnet mentioned. Thereafter, the marking magnets mentioned are further reoperated and restored in sequence, in the event this is necessary, until the marking magnet finally reoperated corresponds to the desired subscriber line in the previously selected group of subscriber lines; at which time the secondary magnet SM111 is energized in order to operate the secondary operating element 301, causing the secondary bar corresponding to the desired subscriber line in the previously selected group of subscriber lines to be operated in the manner explained above; the secondary bar mentioned being clutched to the secondary operating element 301 at this time by virtue of the position of the finally operated marking magnet mentioned.

Finally, the switch mechanism SM100 comprises, as best shown in Fig. 4, a mechanical latching arrangement between the primary operating element 201 and the secondary operating element 301, including a latch lug 401 rigidly secured to the primary operating element 201 and a cam 402 rigidly secured to the secondary operating element 301. More particularly, the latch lug 401 is secured to the primary operating element 201 in a position disposed between the step-bearing element 202 and the armature 206 of the primary magnet PM111; and the cam 402 is secured to the secondary operating element 301 in a position disposed between the step-bearing element 302 and the armature 306 of the secondary magnet SM111. A latch bar 403 is pivotally mounted at the extreme left-hand end thereof upon a screw 404 secured to the top plate 102 and carries a roller 405 adjacent to the extreme right-hand end thereof. The latch bar 403 is normally biased in the clockwise direction, as viewed in Fig. 4, toward the latch lug 401 and the cam 402 by a coil spring 406, one end of the coil spring 406 being secured to a pin 407 carried by the latch bar 403 and the other end of the coil spring 406 being secured to a pin 408 carried by the top plate 102. Further, the latch bar 403 carries a latch dog 409 that is adapted to enter a latch keeper or slot 410 formed in the latch lug 401 under certain operating conditions explained subsequently. Finally, the roller 405 carried by the extreme right-hand end of the latch bar 403 engages a contoured cam surface 411 provided on the cam 402, thereby to restrain the latch bar 403 in its normal position wherein the latch dog is removed from the associated keeper 410 formed in the latch lug 401. Moreover, the keeper 410 formed in the latch lug 401 is normally disposed in an angularly offset relation in counterclockwise direction with respect to the latch dog 409 carried by the latch bar 403; whereby the latch dog 409 may not enter the keeper 410 formed in the latch lug 401, when the primary operating element 201 occupies its home position.

During the course of operation of the switch mechanism SM100, when the primary operating element 201 is operated away from its home position the latch lug 401 is rotated in the clockwise direction, as viewed in Fig. 4, whereby the keeper 410 formed in the latch lug 401 is aligned with respect to the latch dog 409 carried by the latch bar 403. However, at this time, the latch dog 409 is restrained out of the keeper 410 formed in the latch lug 401 by virtue of engagement between the roller 405 carried on the extreme outer end of the latch bar 403 and the cam surface 411 formed on the cam 402. Subsequently, when the secondary element 301 is operated, the cam 402 is rotated in the counterclockwise direction, as viewed in Fig. 4; whereby the roller 405 rolls down the cam surface 411 formed in the cam 402 under the bias of the coil spring 406; whereby the latch bar 403 is rotated in the clockwise direction, as viewed in Fig. 4, causing the latch dog 409 to enter the keeper 410 formed in the latch lug 401. At this time, the winding 205 of the primary magnet PM111 may be deenergized without effecting restoration of the primary operating element 201 to its home position, so long as the winding 305 of the secondary magnet SM111 is maintained energized. In other words, the operated secondary operating element 301 maintains operated the primary operating element 201 by virtue of the latching arrangement described above. Subsequently, when the winding 305 of the secondary magnet SM101 is deenergized, the secondary operating element 301 is returned to its home position as previously explained; whereby the cam 402 is rotated in the clockwise direction back into its home position, causing the roller 405 carried on the extreme right-hand end of the latch bar 403 to roll up the cam surface 411 formed on the cam 402; whereby the latch bar 403 is rotated in the counterclockwise direction, as viewed in Fig. 4, back into its home position. When the latch bar 403 is thus restored to its home position, the latch dog 409 carried thereby is withdrawn from the keeper 410 formed in the latch lug 401; whereby the latch lug 401 may be rotated in the counterclockwise direction, as viewed in Fig. 4, permitting restoration of the primary operating element 201 back into its home position. At this time the switch mechanism SM100 is completely released and available for further use.

*Operation of the finder 600 in conjunction with the control circuit 1000 and the allotter 1100*

When one or more of the finder-selector links in the second group are idle, ground potential is applied to the links-busy conductor C1109, thereby to maintain operated the links-busy relay R1150 in the allotter 1100. For example, when the first finder-selector link illustrated is idle, the test relay R640 in the finder 600 occupies its restored position, completing, at the contacts 646, an obvious path for applying ground potential to the links-busy conductor C1109. The operated links-busy relay R1150 in the allotter 1100 maintains operated the reset relay R1145 and one of the link relays R1130, R1120, etc., corresponding to the idle link in the second group that is assigned at this time. Assuming that the first link mentioned is idle at this time and that the allotter 1100 is operated to select this link to handle the next call originating at a calling subscriber substation in the second 100 line group in the system, the link relay R1130 in the allotter 1100 occupies its operated position. More particularly, a series circuit is completed extending from ground by way of the contacts 1152 of the operated links-busy relay R1150, the winding of the reset relay R1145, the winding of the fault relay R1140, the contacts 1142, 1126 and 1135 of the operated link relay R1130 and the lower winding of R1130 to battery; whereby the reset relay R1145 and the link relay R1130 are maintained operated. However, the fault relay R1140 is not operated since the latter relay is of the marginal type. The operating link relay R1130 corresponding to the first link mentioned prepares, at the contacts 1131, a path traced hereinafter for applying ground potential to the link start conductor C1101 extending to the start relay R630 in the finder 600; and prepares, at the contacts 1134, a circuit traced hereinafter, including the guard conductor C1102 extending into the selector 700, for energizing the upper winding of the link relay R1120 in series with the upper winding of the link disconnect relay R1160; the link relay R1120 corresponding to one of the intermediate links in the second group. Finally, it is noted that the link relay R1110 corresponds to the last link in the second group. Accordingly, at this time, the allotter 1100 is operated to select the first link, comprising the finder 600 and the selector 700, to handle the next call originating at one of the calling subscriber substations in the second 100 line group in the system.

Now assuming that a call is initiated at the subscriber substation T611, included in the second 100 group, a circuit is completed including the line conductors C691 and C692 of the subscriber line 690 extending thereto and the contacts 661 and 662 for energizing in series the left-hand and right-hand windings of the line relay R655 in the line circuit 650 individual to the subscriber line 690. When thus energized, the line relay R655 operates to interrupt, at the contacts 657, multiple circuits for applying battery potential to the control conductor C693 of the subscriber line 690; and to complete, at the contacts 656, an obvious path for applying ground potential to the control conductor C693; thereby to mark the subscriber line 690 as busy to the connectors 800, etc., in the second group having access thereto. The normally completed multiple paths mentioned for applying battery potential to the control conductor C693 of the subscriber line 690 include the winding of the cutoff relay R660 and the contacts 663 and the resistor 665 in the line circuit 650. Also, the line relay R655 completes, at the contacts 658, multiple paths substantially identical to those previously traced for applying battery potential to the control conductor C694 of the subscriber line 690, thereby to mark the position of the primary contact set PC611 terminating the subscriber line 690 in the switch mechanism SM600 incorporated in the finder 600. Finally, the line relay R655 completes, at the contacts 659, an obvious path for applying ground potential to the first group start conductor C1002 extending into the control circuit 1000, thereby to initiate operation of the control circuit 1000 and the allotter 1100 and to mark the group of primary contact sets including the primary contact set PC611 terminating the subscriber line 690 in the switch mechanism SM600 incorporated in the finder 600.

More particularly, the application of ground potential to the first group start conductor C1002, common to the first group of ten subscriber lines, including the subscriber line 690, marks the group position of the subscriber line 690 to the control circuit 1000, as previously noted; and also completes a circuit, including the resistor 1025, for operating the start relay R1175 in the allotter 1100. Upon operating the start relay R1175 completes, at the contacts 1176, a circuit, including the contacts 1186 and 1151, for energizing the lower winding of the link start relay R1180, thereby to cause the latter relay to operate. Upon operating the link start relay R1180 completes, at the contacts 1181, a holding circuit, including the contacts 1171 and 1176, for energizing the lower winding thereof; and completes, at the contacts 1183, a multiple holding circuit for energizing in series the winding of the reset relay R1145, the lower winding of the fault relay R1140 and the lower winding of the link relay R1130, thereby to maintain operated the reset relay R1145 and the link relay R1130 incident to restoration of the links-busy relay R1150 in the special event that the first link mentioned is the last idle link in the second group. Further, the link start relay R1180 completes, at the contacts 1184, a circuit, including the contacts 1188, for operating the timer relay R1195; whereby the latter relay sets into vibration its armature RA1196. Finally, the link start relay R1180 completes, at the contacts 1182, a path, including the contacts 1161 and the contacts 1131 of the operated link relay R1130, for applying ground potential to the first link start conductor C1101; whereby the start relay R630 in the finder 600 is operated. Operation of the start relay R630 in the finder 600 is effective to initiate operation thereof in conjunction with operation of the control circuit 100 in a manner more fully explained hereinafter in order to cause the switch mechanism SM600 to be operated promptly to find the subscriber line 690 extending to the calling subscriber substation T611 in the ordinary case; whereupon the cut-through relay R1170 in the allotter is operated in order to prevent a timing operation therein.

However, assuming that for some reason the finder 600 does not operate promptly to find the subscriber line 690 extending to the calling subscriber substation T611, a timing operation is brought about in the allotter 1100; whereby another idle link in the second group is assigned to find the subscriber line 690 extending to the calling subscriber substation T611 and the first link illustrated is released. More particularly, the vibrating armature RA1196 closes, at the contacts 1198 and 1199, a circuit, including the contacts 1184, for operating the timer relay R1190 shortly thereafter, the latter relay being of the slow-to-operate type. Upon operating, the timer relay R1190 prepares, at the contacts 1194, an alternative circuit, including the contacts 1197 and the contacts 1184, for energizing the winding thereof; which circuit is completed each time the vibrating armature RA1196 closes the contacts 1197. Also, upon operating the timer relay R1190 completes, at the contacts 1192, a circuit, including the contacts 1184, for operating the control relay R1185. Upon operating the control relay R1185 interrupts, at the contacts 1188, the previously traced circuit for maintaining operated the timer relay R1195, thereby to cause the latter relay to restore; whereby the armature RA1196 is again vibrated. The armature RA1196 vibrates for a considerable time interval maintaining operated the timer relay R1190; however, after a predetermined time interval the armature RA1196 settles down; whereby the contacts 1197 and 1198 are no longer completed alternately in order to effect restoration of the timer relay R1190. Upon restoring the timer relay R1190 interrupts, at the contacts 1192, the previously mentioned circuit for maintaining operated the control relay R1185; however, the latter relay does not restore immediately since it is of the slow-to-release type. Also, upon restoring the timer relay R1190 completes, at the contacts 1193, a circuit, including the contacts 1184, 1187, 1154, 1133, 1114, 1134 and 1155, for energizing the upper winding of the link relay R1120 in series with the upper winding of the link disconnect relay R1160, thereby to cause the latter relays to operate. Upon operating the link disconnect relay R1160 interrupts, at the contacts 1161, the previously traced path for applying ground potential to the first link start conductor C1101 extending to the first link illustrated in order to effect restoration of the start relay R630 in the finder 600 and the consequent release of the first link. Further, the link disconnect relay R1160 completes, at the contacts 1163, a holding circuit, including the contacts 1174, 1187, 1193 and 1184, for energizing the lower winding thereof. Upon operating the link relay R1120 interrupts, at the contacts 1126, the previously traced series holding circuit for energizing the lower winding of the link relay R1130 and the lower winding of the fault relay R1140 and the winding of the reset relay R1145, thereby to cause the link relay R1130 to restore immediately; the reset relay R1145 does not restore immediately, since it is of the slow-to-release type. Also, the link relay R1120, upon operating, completes, at the contacts 1125, a holding circuit, including the contacts 1116, 1142 and 1152, for energizing the lower winding thereof in series with the lower winding of the fault relay R1140 and the winding of the reset relay R1145; whereby the link relay R1120 and the reset relay R1145 are maintained in their operated positions. Further, the link relay R1120 prepares, at the contacts 1121, a path for applying ground potential to the link start conductor C1103 extending to the finder of the associated intermediate link. When the control relay R1185 restores, it interrupts, at the contacts 1187, the previously traced holding circuit for energizing the lower winding of the link disconnect relay R1160, thereby to cause the latter relay to restore at this time, since the previously traced circuit for energizing the upper winding of the link disconnect relay R1160 in series with the upper winding of the link relay R1120 was interrupted, at the contacts 1134, of the link relay R1130 incident to restoration thereof. Upon restoring the link disconnect relay R1160 completes, at the contacts 1161, a path including the contacts 1182 and 1121 of the operated link relay R1120 for applying ground potential to the link start conductor C1103 extending to the finder of the intermediate link; whereby operation of the finder of the intermediate link proceeds. More specifically, the finder of the intermediate link mentioned cooperates with the control circuit 100 to hunt for the subscriber line 690 extending to the calling subscriber substation T611 in a manner identical to that of the finder 600 of the first link illustrated described below.

Now assuming, that the finder 600 of the first link operates promptly to find the subscriber line 690 extending to the calling subscriber substation T611 and before operation of the timing apparatus in the allotter 1100 in the manner described above; upon operating the start relay R630 in the finder 600 completes, at the contacts 630, a path for applying ground potential to the hunt conductor C1108; whereby a circuit, including the contacts 1191 and 1023, is completed for operating the start relay R1010 in the control circuit 1000, when the timer relay R1190 in the allotter 1100 closes the contacts 1191. Upon operating the start relay R1010 completes, at the contacts 1011, a path, including the contacts 1021 and 1031, for applying ground potential to the pulse conductor C1005, thereby to complete a circuit, including the contacts 635 of the operated start relay R630 in the finder 600, for energizing the magnet M623 of the marker switch 620. When the magnet M623 is thus energized, it operates immediately to drive the wipers 621 and 622 of the marker switch 620 one step in the clockwise direction away from their home positions into engagement with the first contacts in the associated contact banks. Also, upon operating, the magnet M623 completes, at the contacts 625, a path, including the contacts 635 and 634 of the operated start relay R630, for connecting the grounded pulse conductor C1005 to the interrupter conductor C1004. This application of ground potential to the interrupter conductor C1004 completes an obvious circuit for energizing the upper winding of the step relay R1030 in the control circuit 1000, thereby to cause the latter relay to operate. Upon operating the step relay R1030 completes, at the contacts 1034, a holding circuit, including the contacts 1048, 1053 and 1013, for energizing the lower winding thereof. Also, upon operating, the start relay R630 in the finder 600 completes, at the contacts 637, a circuit for energizing the left-hand winding of the test relay R640, thereby to render the latter relay exceedingly fast to operate when the right-hand winding thereof is subsequently energized. When the wiper 621 of the marker switch 620 engages the first contact in the associated contact bank, a circuit, including the contacts 636 of the operated start relay R630, is completed for energizing the first marking magnet MM601, thereby to cause the first marking magnet MM601 to operate and to clutch the first primary bar PB601 to the primary operating element associated with the primary magnet PM611 and to clutch the first secondary bar SB601 to the secondary operating element associated with the secondary magnet SM611.

Also, when the step relay R1030 in the control circuit 1000 operates, it interrupts, at the contacts 1031, the previously mentioned path for applying ground potential to the pulse conductor C1005, thereby to interrupt the multiple circuits for energizing the magnet M623 of the marker switch 620 in the finder 600 and the upper winding of the step relay R1030; whereby the magnet M623 restores and the step relay R1030 is maintained in its operated position due to the completed holding circuit for energizing the lower winding thereof. When the wipers noted of the marker switch 620 are driven from their home positions, the set of switch springs S626 is actuated for a purpose more fully explained hereinafter. Also, when the step relay R1030 in the control circuit 1000 operated, it completed, at the contacts 1032, a path, including the contacts 1013, 1043 and 1041 and the associated resistor, for energizing the upper winding of the transfer relay R1050, thereby to cause the latter relay to operate since the lower winding of the transfer relay R1050 was energized incident to operation of the start relay R1010. The transfer relay R1050 is of the polarized type and after the lower winding thereof was energized via the circuit completed, at the contacts 1013 of the operated start relay R1010, it operates exceedingly fast when the upper winding thereof is subsequently energized via the circuit completed, at the contacts 1032 of the operated step relay R1030. Upon operating the transfer relay R1050 interrupts, at the contacts 1053, the previously traced holding circuit for energizing the lower winding of the step relay R1030, thereby to cause the latter relay to restore, since the previously traced circuit for energizing the upper winding thereof was interrupted, at the contacts 625, incident to restoration of the magnet M623 of the marker switch 620 in the finder 600.

Also incident to operation of the start relay R1010 there is completed, at the contacts 1013, a circuit, including the contacts 1046 and 1061, for operating the first counting relay R1065. Upon operating the first counting relay R1065 completes, at the contacts 1069, a circuit, including the contacts 1013 and the contacts 1089 and 1093, arranged in multiple, for operating the reset relay R1060. Also, the first counting relay R1065 completes, at the contacts 1068, an alternative holding circuit including the contacts 1072, 1077, 1082, 1087 and 1013 for energizing the winding thereof. Upon operating the reset relay R1060 interrupts, at the contacts 1061, the previously traced original circuit for energizing the winding of the first counting relay R1065; and completes, at the contacts 1062, a holding circuit, including the multiple contacts 1089 and 1093, as well as the contacts 1013, for energizing the winding thereof.

Further, the first counting relay R1065 completes, at the contacts 1066', a connection including the contacts 1095 between the lower winding of the stop relay R1020 and the first group start conductor C1002; whereby the stop relay R1020 tests to determine whether the calling subscriber line is included in the first group of ten subscriber lines accessible to the finder 600. In the present example, the subscriber line 690 extending to the calling subscriber substation T611 is included in the first group of ten subscriber lines accessible to the finder 600; whereby ground potential appearing upon the first group start conductor C1002 completes a circuit for energizing the lower winding of the stop relay R1020 in order to cause the latter relay to operate. Upon operating the stop relay R1020 interrupts, at the contacts 1023, the previously traced circuit for maintaining operated the start relay R1010, thereby to cause the latter relay to restore shortly thereafter, it being of the slow-to-release type. Also, the stop relay R1020 completes, at the contacts 1024, a holding circuit, including the contacts 1191 and the grounded hunt conductor C1108, for energizing the upper winding thereof. Further, the stop relay R1020 interrupts, at the contacts 1021, a further point in the previously traced path for applying ground potential to the pulse conductor C1005, thereby positively to prevent further operation of the magnet M623 of the marker switch 620. Finally, the stop relay R1020 prepares, at the contacts 1022, a path, including the contacts 1031, for applying ground potential to the primary magnet conductor C1003; which path is completed, at the contacts 1012, incident to the restoration of the start relay R1010. The application of ground potential to the magnet conductor C1003 completes a circuit, including the contacts 631, for operating the primary magnet PM611 in the finder 600. Also, upon restoring, the start relay R1010 interrupts, at the contacts 1013, the previously traced multiple circuits for energizing the upper and lower windings of the transfer relay R1050, thereby to cause the latter relay to restore; and interrupts, at the contacts 1013, the previously traced multiple holding circuits for maintaining operated the reset relay R1060 and the first counting relay R1065 in order to cause the latter relays to restore.

When the primary magnet PM611 of the switch mechanism SM600 in the finder 600 is operated, the first primary bar PB601 clutched to the primary operating element by the operated first marking magnet MM601 is operated; whereby the first group of ten primary contact sets PC611, PC612, etc., and PC610 are operated to connect the subscriber lines in the first group of ten to the ten riser busses RB601, RB602, etc., and RB600, respectively. At this time, the wiper 622 of the marker switch 620 engages the first contact in the associated contact bank; whereby the control conductor of the first riser bus RB601 is connected to the right-hand winding of the test relay R640 and thence by way of the contacts 638 to ground. Accordingly, in the event the calling subscriber line is connected to the first riser bus RB601, a circuit is immediately completed for energizing the right-hand winding of the test relay R640; which, of course, is the present case, since the subscriber line 690 is connected via the first primary contact set PC611 in the first group of ten to the first riser bus RB601.

When the right-hand winding of the test relay R640 is thus energized, it operates exceedingly fast to interrupt, at the contacts 641, a point in a circuit that would have been completed for effecting reoperation of the magnet M623 of the marker switch 620. More particularly, when the primary magnet PM611 operated to operate the ten primary contact sets PC611, etc., it ultimately prepared, at the contacts 612, at the end of its operating stroke, a circuit including the contacts 641, 633 and 624, for operating the magnet M623 of the marker switch 620, which circuit would have been completed had it not been for the operation of the test relay R640 exceedingly fast, in the present example, to interrupt, at the contacts 641, the circuit above-traced. Accordingly, in the present example, since the calling subscriber line 690 is terminated in the first primary contact set PC611 in the first group of ten, it is not necessary to reoperate the marker switch 620 beyond the position wherein the wipers 621 and 622 thereof engage the first contacts in the associated contact banks.

Further, the test relay R640 completes, at the contacts 642, an obvious path for short-circuiting the right-hand winding thereof; whereby direct ground potential, at the contacts 638, is applied to the control conductor of the first riser bus RB601, and consequently to the control conductor C694 of the subscriber line 690 having battery potential thereon marking the subscriber line 690 as the calling subscriber line, as previously explained. The application of direct ground potential to the control conductor C694 of the subscriber line 690 completes a circuit including the contacts 658 for operating the cut-off relay R660 in the line circuit 650 individual to the subscriber line 690. Upon operating, the cut-off relay R660 interrupts, at the contacts 663, the previously mentioned path for applying battery potential by way of the resistor 665 to the control conductor C694 of the subscriber line 690; and completes, at the contacts 664, a holding circuit for energizing the winding thereof from the grounded control conductor C694 of the subscriber line 690. Further, the cut-off relay R660 interrupts, at the contacts 661 and 662, the previously traced loop circuit extending between the calling subscriber substation T611 and the left-hand and right-hand windings of the line relay R655, thereby to cause the latter relay to restore. Upon restoring the line relay R655 completes, at the contacts 657, a path, including the contacts 664, between the control conductors C693 and C694 of the subscriber line 690, thereby to continue the marking of the subscriber line 690 as busy to the connectors 800, etc., in the second group having access thereto. Further, upon restoring the line relay R655 interrupts, at the contacts 659, the previously mentioned path for applying ground potential to the first group start conductor C1002, thereby to interrupt the previously traced circuit for maintaining operated the start relay R1175 in the allotter 1100 and for energizing the lower winding of the stop relay R1020 in the control circuit 1000. Further, the test relay R640 in the finder 600 completes, at the contacts 643, a path including the contacts 639 for applying ground potential to the cut-through conductor C1107, thereby to complete obvious multiple circuits for energizing the winding of the cut-through relay R1170 and the upper winding of the link start relay R1180 in the allotter 1100; whereby the cut-through relay R1170 operates and the link start relay R1180 is maintained operated, notwithstanding the restoration of the start relay R1175 as previously noted. Further, the test relay R640 in the finder 600 completes, at the contacts 644, an obvious circuit for operating the secondary magnet SM611; whereby the secondary operating element effects operation of the first secondary bar SB601 to clutch thereto by virtue of the operated position of the first marking magnet MM601. Upon operating the first secondary bar SB601 operates the first secondary contact set SC601, thereby to connect the first riser bus RB601 to the trunk 730 in order to complete a loop circuit extending from the calling subscriber substation T611 to the upper and lower windings of the line relay R750 in the selector 700; whereby the line relay R750 operates. Further, the test relay R640 in the finder 600 completes, at the contacts 645, a path including the contacts 637 for applying ground potential to the control conductor C733 of the trunk 730, thereby to complete a circuit for energizing the lower winding of the test relay R740 in the selector 700 in order to render the latter relay exceedingly fast to operate when the upper winding thereof is subsequently energized, since the test relay R740 is of the polarized type. Finally, the test relay R640 in the finder 600 interrupts, at the contacts 646, one of the multiple paths for applying ground potential to the links-busy conductor C1109 extending to the links-busy relay R1150 in the allotter 1100 for the purpose previously explained.

Upon operating the line relay R750 in the selector 700 completes, at the contacts 752, an obvious circuit for operating the hold relay R760. Upon operating the hold relay R760 completes, at the contacts 765, a path for applying ground potential by way of the upper winding of the test relay R740 to the wiper 722 of the marker switch 720; and completes, at the contacts 766, a multiple path for applying ground potential to the control conductor C733 of the trunk 730, thereby to maintain operated the test relay R640 in the finder 600 subsequent to restoration of the start relay R630 therein. Finally, the hold relay R760 completes, at the contacts 767, a path for applying ground potential to the first guard conductor C1102 extending into the allotter 1100; thereby to complete a circuit, including the contacts 1134 and 1155, for energizing in series the upper winding of the link relay R1120 and the upper winding of the link disconnect relay R1160; whereby the relays mentioned operate. Upon operating the link relay R1120 effects the restoration of the link relay R1130 in the manner previously explained; whereby ground potential is removed, at the contacts 1131, from the first link start conductor C1101 extending to the finder 600 in order to cause the start relay R630 therein to restore. Upon restoring the start relay R630 interrupts, at the contacts 631, 634, 635, 639 and 630, the connections between the finder 600 and the control circuit 1000 and the allotter 1100. Specifically, the start relay R630 interrupts, at the contacts 631, the previously traced circuit for energizing the primary magnet PM611; however, the associated primary operating element is not restored to its home position at this time due to the mechanical latching arrangement disposed between the primary operating element and the secondary operating element, since the secondary operating element is maintained in its operated position by the operated secondary magnet SM611. The secondary magnet SM611, in turn, is retained in its operated position by the operated test relay R640; which, in turn, is retained in its operated position by virtue of the energization of the left-hand winding thereof over the previously traced circuit including the grounded control conductor C733 of the trunk 730. Also, upon restoring the start relay R630 completes, at the contacts 632, an alternative circuit including the set of switch springs S626 and the contacts 624 for operating the magnet M623 of the marker switch 620; whereby the magnet M623 is operated buzzer-fashion to drive the wipers noted of the marker switch 620 step by step in the clockwise direction back into their home positions; whereupon the set of switch springs S626 is actuated to open the circuit for operating the magnet M623. Accordingly, at this time, the finder 600 has operated to find the subscriber line 690 extending to the calling subscriber substation T611 and to connect the subscriber line 690 to the trunk 730 extending to the selector 700; whereupon the selector 700 is conditioned to be responsive to the first digit dialed at the calling subscriber substation T611 in a manner more fully explained hereinafter.

Upon operating the cut-through relay R1170 in the allotter 1100 interrupts, at the contacts 1171, the holding circuit for energizing the lower winding of the link start relay R1180, thereby to cause the latter relay to restore, since the start relay R630 in the finder 600 has, by this time, restored to interrupt, at the contacts 639, the previously traced multiple circuit for energizing the winding of the cut-through relay R1170 and the upper winding of the link start relay R1180. Also, upon operating the cut-through relay R1170 completes, at the contacts 1172, an obvious path for short-circuiting the lower winding of the fault relay R1140, thereby positively to prevent the operation of the latter relay incident to operation of the link relay R1120 and prior to restoration of the link relay R1130. Finally, the cut-through relay R1170 completes, at the contacts 1173, a holding circuit including the contacts 1163 for energizing the lower winding of the link disconnect relay R1160. Shortly thereafter the cut-through relay R1170 restores since it is of the slow-to-release type, interrupting, at the contacts 1172, the previously mentioned path for short-circuiting the lower winding of the fault relay R1140; and interrupting, at the contacts 1173, the holding circuit for energizing the lower winding of the link disconnect relay R1160; whereby the latter relay restores, since it is assumed that, by this time, the link relay R1120 has completely operated effecting the restoration of the link relay R1130. Upon restoring the link start relay R1180 interrupts, at the contacts 1182, a further point in a path, including the contacts 1161 and 1121, for applying ground potential to the link start conductor C1103 extending to the intermediate link. Also, the link start relay R1180 interrupts, at the contacts 1184, the circuits for maintaining operated the timer relay R1190 and the control relay R1185, thereby to cause the latter relays to restore, the control relay R1185 being slow to release as previously noted. At this time the control circuit 1000 and the allotter 1100 are completely released and available for further use.

Now assuming that the call is initiated at the subscriber substation T602, included in the second 100 group, the line relay R675 in the line circuit 670, individual to the subscriber line 695, extending to the calling subscriber substation T602 operates; thereby to initiate operation of the control circuit 1000, the allotter 1100 and the finder 600 in a manner substantially identical to that previously described. However, in this case, since the calling subscriber line 695 terminates in the primary contact set PC602 in the switch mechanism SM600, considerable operation of the control circuit 1000 in conjunction with the switch mechanism SM600 proceeds before the calling subscriber line 695 is found, as the primary contact set PC602 is arranged in the tenth group of ten primary contact sets in the switch mechanism SM600.

More particularly, the first time the step relay R1030 in the control circuit 1000 operates, operation of the transfer relay R1050 is brought about as previously explained, while the first counting relay R1065 occupies its operated position. At this time, the previously traced circuit for energizing the lower winding of the stop relay R1020 is not completed, since the winding mentioned is connected at the contacts 1066′ to the first group start conductor C1002; whereas ground potential appears upon the tenth group start conductor C1001, since the calling subscriber line 695 appears in the tenth group of subscriber lines accessible to the switch mechanism SM600 as previously noted. Accordingly, when the magnet M623 of the marker switch 620 restores it interrupts, at the contacts 625, the previously traced path for connecting the pulse conductor C1005 to the interrupter conductor C1004, thereby to interrupt the previously traced circuit for energizing the upper winding of the step relay R1030; whereupon the latter relay restores, assuming that the transfer relay R1050 has operated to interrupt, at the contacts 1053, the previously traced holding circuit for energizing the lower winding of the step relay R1030. Upon restoring the step relay R1030 recompletes, at the contacts 1031, the previously traced path for applying ground potential to the pulse conductor C1005, thereby to bring about reoperation of the magnet M623 of the marker switch 620 in order to drive the wipers noted thereof an additional step in the clockwise direction. Also, upon operating the magnet M623 recompletes, at the contacts 625, the previously traced connection between the grounded pulse conductor C1005 and the interrupter conductor C1004; whereby the previously traced circuit for energizing the upper winding of the step relay R1030 is recompleted, causing the latter relay to reoperate.

The magnet M623 of the marker switch 620 in the finder 600 cooperates with the step relay R1030 in the control circuit 1000 in the manner described above; whereby the step relay R1030 operates and restores repeatedly; and the magnet M623 operates and restores repeatedly, thereby to drive the wipers noted of the marker switch 620 stey by step in the clockwise direction. When the wiper 621 of the marker switch 620 disengages the first contact and engages the second contact in the associated contact bank, the previously traced circuit for maintaining operated the first marking magnet MM601 is interrupted and a substantially identical circuit is completed for operating the second marking magnet MM602; whereby the first marking magnet MM601 restores and the second marking magnet MM602 operates. Accordingly, as the marker switch 620 is driven step by step the marking magnets MM601, MM602, etc., are operated and subsequently restored in sequence; whereby the corresponding pairs of primary and secondary bars PB601, SB601 and PB602, SB602, etc., are clutched and then declutched from the respective primary and secondary operating elements, respectively associated with the primary magnet PM611 and with the secondary magnet SM611.

Considering now the operation of the control circuit 1000 in greater detail, the first time the step relay R1030 is operated the transfer relay R1050 is operated as previously noted. The first time the step relay R1030 restores it completes, at the contacts 1033, a circuit including the contacts 1013 and 1051 for energizing the lower winding of the transfer relay R1040; whereby the latter relay operates. At this time the transfer relay R1050 is retained in its operated position by virtue of the fact that the lower winding thereof is energized by way of the previously traced circuit, including the contacts 1013. The next time the step relay R1030 operates it completes, at the contacts 1032, a circuit, including the contacts 1013, 1042 and 1044 for energizing the upper winding of the transfer relay R1050 in series with the upper winding of the transfer relay R1040; whereby the transfer relay R1050 is restored and the transfer relay R1040 is retained in its operated position. The transfer relay R1050 is restored since the upper winding thereof is now energized in series with the upper winding of the transfer relay R1040 in a direction opposite to that in which it was originally energized, the transfer relay R1050 being of the polarized type. The second time the step relay R1030 restores it interrupts, at the contacts 1032, the previously traced circuit for energizing in series the upper winding of the transfer relay R1050 and the upper winding of the transfer relay R1040; whereby the operated transfer relay R1040 restores, since the transfer relay R1050 occupies its restored position. It is noted that the transfer relay R1050 is not capable of operation when the lower winding thereof alone is energized, but that the lower winding of the transfer relay R1050 is capable of retaining it operated after it is once operated and prior to energization of the upper winding thereof in the reverse direction. In view of the foregoing description of the mode of operation of the step relay R1030 in conjunction with the transfer relays R1040 and R1050, it will be understood that the position sequence of the relays mentioned is as follows:

| Step Relay R1030 | Transfer Relay R1040 | Transfer Relay R1050 |
|---|---|---|
| 1st Operation | Restored | Operated. |
| 1st Restoration | Operated | Do. |
| 2nd Operation | Operated | Restored. |
| 2nd Restoration | Restored | Do. |
| 3rd Operation | Restored | Operated. |
| 3rd Restoration | Operated | Do. |
| 4th Operation | Operated | Restored. |
| 4th Restoration | Restored | Do. |
| 5th Operation | Restored | Operated. |
| 5th Restoration | Operated | Do. |
| 6th Operation | Operated | Restored. |
| 6th Restoration | Restored | Do. |
| 7th Operation | Restored | Operated. |
| 7th Restoration | Operated | Do. |
| 8th Operation | Operated | Restored. |
| 8th Restoration | Restored | Do. |
| 9th Operation | Restored | Operated. |
| 9th Restoration | Operated | Do. |
| 10th Operation | Operated | Restored. |
| 10th Restoration | Restored | Do. |

The first time the transfer relay R1040 operates it completes, at the contacts 1044', a holding circuit, including the contacts 1013 and 1051, for energizing the lower winding thereof; which holding circuit is interrupted when the transfer relay R1050 restores to open the contacts 1051. However, at this time, the previously traced circuit for energizing the upper winding of the transfer relay R1040 in series with the upper winding of the transfer relay R1050 is completed until the step relay R1030 restores the second time, thereby bringing about restoration of both of the transfer relays R1040 and R1050 as explained above. Also, each time the transfer relay R1040 restores it reprepares, at the contacts 1041 and 1043, the previously traced original circuit for energizing the upper winding of the transfer relay R1050; whereby the latter relay is poled to operate the next time the step relay R1030 operates, thereby maintaining the schedule of operation and restoration of the transfer relays R1040 and R1050 as explained above. Also, it is noted that each time the step relay R1030 operates while both of the transfer relays R1040 and R1050 are restored, it completes, at the contacts 1034, the previously traced holding circuit including the contacts 1048 and 1053 for energizing the lower winding thereof; which circuit is later interrupted at the contacts 1053 when the transfer relay R1050 next operates. Also, each time the step relay R1030 operates when both the transfer relays R1040 and R1050 are operated, it completes at the contacts 1034, a holding circuit including the contacts 1047 and 1052 for energizing the lower winding thereof; which circuit is then interrupted at the contacts 1052 when the transfer relay R1050 is next restored.

The first time the transfer relay R1040 operates it completes, at the contacts 1045, a circuit including the contacts 1013 and 1067 for operating the second counting relay R1070. Upon operating the second counting relay R1070 completes, at the contacts 1073, a holding circuit, including the contacts 1077, 1082, 1087 and 1013, for energizing the winding thereof; and interrupts, at the contacts 1072, the previously traced holding circuit for maintaining operated the first counting relay R1065. The first time the transfer relay R1040 restores it completes, at the contacts 1046, a circuit including the contacts 1013 and 1071 for operating the third counting relay R1075. Upon operating the third counting relay R1075 completes, at the contacts 1078, a holding circuit, including the contacts 1082, 1087 and 1013, for energizing the winding thereof; and interrupts, at the contacts 1077, the previously traced holding circuit for maintaining operated the second counting relay R1070. The second time the transfer relay R1040 operates it completes, at the contacts 1045, a circuit including the contacts 1013 and 1076 for operating the fourth counting relay R1080. Upon operating the fourth counting relay R1080 completes, at the contacts 1083, a holding circuit, including the contacts 1087 and 1013, for energizing the winding thereof; and interrupts, at the contacts 1082, the previously traced holding circuit for maintaining operated the third counting relay R1075.

In view of the foregoing description of the mode of operation of the transfer relay R1040 in conjunction with the five counting relays R1065, R1070, R1075, R1080 and R1085, it will be understood that the counting relays mentioned are operated sequentially, the fifth counting relay R1085 being operated incident to the second restoration of the transfer relay R1040. Upon operating the fifth counting relay R1085 completes, at the contacts 1088, a holding circuit including the contacts 1066 and 1013 for energizing the winding thereof. Upon the third operation of the transfer relay R1040 there is completed, at the contacts 1045, a circuit, including the contacts 1013, 1086 and 1091 for operating the reflex relay R1090. Upon operating the reflex relay R1090 completes, at the contacts 1092, a holding circuit, including the contacts 1013, for energizing the winding thereof; and interrupts, at the contacts 1093, the previously traced holding circuit for maintaining operated the reset relay R1060, thereby to cause the latter relay to restore. Upon the third restoration of the transfer relay R1040 there is recompleted, at the contacts 1046, the previously traced circuit for operating the first counting relay R1065. Upon reoperating the first counting relay R1065 interrupts, at the contacts 1066, the previously traced holding circuit for maintaining operated the fifth counting relay R1085.

In view of the above description of the mode of operation of the five counting relays R1065, R1070, R1075, R1080 and R1085 in conjunction with the reflex relay R1090, it will be understood that the cycle of operation of these relays is as follows:

| Counting Relay Operated | Reflex Relay R1090 |
|---|---|
| R1065 | Restored. |
| R1070 | Do. |
| R1075 | Do. |
| R1080 | Do. |
| R1085 | Do. |
| R1085 | Operated. |
| R1065 | Do. |
| R1070 | Do. |
| R1075 | Do. |
| R1080 | Do. |

In the present example, when the fourth counting relay R1080 is reoperated in conjunction with the reflex relay R1090 following the tenth operation of the magnet M623 of the marker switch 620 in the finder 600, a direct circuit is completed at the contacts 1081', and including the contacts 1094 of the operated reflex relay R1090, for energizing the lower winding of the stop relay R1020 in order to cause the latter relay to operate in a manner analogous to that previously explained. At this time the wipers noted of the marker switch 620 have been driven ten steps from their home positions back into their home positions; whereby the tenth marking magnet MM600 occupies its operated position. Accordingly, upon operating the stop relay R1020 effects operation of the primary magnet PM611 in the switch mechanism SM600 in the finder 600 in the manner previously explained. Upon operating the primary magnet PM611 operates the ten primary contact sets in the tenth group, and including the primary contact set PC602 terminating the subscriber line 695 extending to the calling subscriber substation T602. At this time the wiper 622 of the marker switch 620 engages the home contact in the associated contact bank, thereby to test the subscriber line connected by way of the primary contact set PC601 to the tenth riser bus RB600; and assuming that the subscriber line mentioned is not in a calling condition at this time, further operation of the marker switch 620 is brought about. More particularly, upon operating the primary magnet PM611, at the conclusion of its stroke, completes, at the contacts 612, the previously traced alternative circuit, including the contacts 641, 633 and 624, for operating the magnet M623 of the marker switch 620; whereby the latter magnet drives the wipers noted of the marker switch 620 one step in the clockwise direction away from their home positions. Also, upon operating the magnet M623 interrupts, at the contacts 624, the above traced circuit for operating it; whereby the magnet M623 restores in order to recomplete, at the contacts 624, its operating circuit. Accordingly, the magnet M623 operates buzzer-fashion in order to drive the wipers noted of the marker switch 620 step by step in the clockwise direction until the test relay R640 tests the calling subscriber line in the tenth group, in the present example. In this case, the subscriber line 695 extending to the calling subscriber substation T602 is terminated by the primary contact set PC602 which, at this time, is connected to the first riser bus RB601. Thus, when the wipers noted of the marker switch 620 are driven to reengage the first contacts in the associated contact bank, a test circuit is completed for energizing the right-hand winding of the test relay R640, thereby to cause the latter relay to operate exceedingly fast. Upon operating the test relay R640 interrupts, at the contacts 641, the circuit previously traced over which the magnet M623 is operated intermittently, thereby positively to arrest further operation thereof, and consequently of the marker switch 620. Also, the test relay R640 completes, at the contacts 644, the previously mentioned circuit for operating the secondary magnet SM611; whereby the first secondary contact set SC601 is operated to connect the first riser bus RB601 to the trunk 730. The remainder of the operation of the finder 600 in response to the operation of the test relay R640 is the same as that previously described in conjunction with the operation of the finder 600 to find the subscriber line 690 extending to the calling subscriber substation T611. Accordingly, at this time, the calling subscriber substation T602 is connected via the operated finder 600 to the selector 700 and the selector 700 is, again, conditioned to be responsive to the first digit dialed, as previously explained. Further, the release of the control circuit 1000 and the subsequent operation of the allotter 1100 to assign another idle link for use of the next calling subscriber line in the second 100 line group accessible to the finders of the associated links, is the same as that previously described.

In the prior description of the allotter 1100 it was noted that when the finder 600 of the link illustrated operated to find a calling line that the selector 700 was conditioned to be responsive to the first digit dialed; that the test relay R640 in the finder 600 interrupted, at the contacts 646, the application of ground potential in the first link to the links-busy conductor C1109; and completed, at the contacts 643, the application of ground potential in the first link illustrated to the cut-through conductor C1107; and that the hold relay R760 in the selector 700 of the link illustrated applied ground potential therein to the first guard conductor C1102. The application of ground potential to the first guard conductor C1102 brought about operation of the link relay R1120 corresponding to the intermediate link at a time while the link relay R1130 corresponding to the first link illustrated was operated; whereby both of the relays R1130 and R1120 are operated simultaneously. However, at this time, the application of ground potential to the cut-through conductor C1107 brought about operation of the cut-through relay R1170, and the consequent short-circuiting of the lower winding of the fault relay R1140; whereby the latter relay was not operated notwithstanding the transitory operation of both of the link relays R1130 and R1140. Upon operating the link relay R1120 brought about the restoration of the link relay R1130 and subsequently when the cut-through relay R1170 restored, the lower winding of the fault relay R1140 was, again, inserted into the series circuit for energizing the winding of the reset relay R1145 and the lower winding of the link relay R1120.

Should it happen, for some reason, that the link relay R1120 does not effect restoration of the link relay R1130, then the lower windings of both of the relays mentioned would be included in multiple in the series circuit for energizing the lower winding of the fault relay R1140 and the winding of the reset relay R1145 upon the restoration of the cut-through relay R1170. In this peculiar event, the lower winding of the fault relay R1140 is sufficiently energized to cause the latter relay to operate, since it is of the marginal type. Upon operating the fault relay R1140 completes, at the contacts 1141, a holding circuit, including the contacts 1146, for energizing the upper winding thereof; and interrupts, at the contacts 1142, the series circuit for energizing the winding of the reset relay R1145, the lower winding of the fault relay R1140 and the lower windings of the link relays R1120 and R1130; whereby the link relays mentioned and the reset relay R1145 restore, the reset relay R1145 being slightly slow-to-release. Upon restoring the reset relay R1145 interrupts, at the contacts 1146, the holding circuit for energizing the upper winding of the fault relay R1140, thereby to cause the latter relay to restore. Also, upon restoring the reset relay R1145 completes, at the contacts 1147, a circuit, including the contacts 1152 and 1155, for energizing the upper winding of the link relay R1130 in series with the upper winding of the link disconnect relay R1160, thereby to cause the relays mentioned to operate. Upon operating the link relay R1130 completes, at the contacts 1135, the previously traced holding circuit for energizing the lower winding thereof in series with the lower winding of the fault relay R1140 and the winding of the reset relay R1145; whereby the reset relay R1145 is reoperated; however, the fault relay R1140 is not reoperated, since it is of the marginal type and only one of the link relays R1130 is connected in the series circuit including the lower winding thereof. Also, at this time, upon operating the link relay R1130 completes, at the contacts 1134, a connection to the first guard conductor C1102 extending into the selector 700 of the first link illustrated and including the upper winding of the link relay R1120, the contacts 1155 and the upper winding of the link disconnect relay R1160. Accordingly, at this time, in the event the first link illustrated is busy, ground potential appearing upon the first guard conductor C1102 brings about operation of the link relay R1120, and the consequent restoration of the link relay R1130; whereby the intermediate link is assigned to the use of the next calling subscriber line in the second group accessible to the finders of the links in the second group.

Now assuming that when the link illustrated becomes attached to a calling subscriber line in the manner previously explained, it is the last available link in the associated second group. In this event, ground potential is completely removed from the links-busy conductor C1109 effecting restoration of the links-busy relay R1150 in the allotter 1100. Upon restoring the links-busy relay R1150 interrupts, at the contacts 1155, the circuit including the upper winding of the link disconnect relay R1160 and the various guard conductors C1102, C1104, C1106, etc., over which the link relays R1120, R1110 and R1130 are sequentially operated, when ground potential appears upon each of the guard conductors mentioned, since all of the links in the associated second group are busy. Further, the links-busy relay R1150 brings about the restoration of the reset relay R1145 by opening the contacts 1152. Also, the links-busy relay R1130 completes, at the contacts 1153, an alternative circuit, including the contacts 1188, for operating the timer relay R1195, thereby to initiate a timing operation of the timing apparatus in the allotter 1100 in the manner previously explained. Thereafter, when one of the links in the associated group becomes idle, ground potential in the finder thereof is replaced upon the links-busy conductor C1109 and ground potential in the selector thereof is removed from the associated guard conductor C1102, C1104, C1106 or others; whereby the links-busy relay R1150 reoperates. Upon reoperating the links-busy relay R1150 recompletes, at the contacts 1152, a circuit, including the contacts 1147 and 1155, for energizing the upper winding of the link relay R1130 in series with the upper winding of the link disconnect relay R1160, thereby to cause the relays mentioned to operate. Upon operating the link relay R1130 recompletes, at the contacts 1135, the previously traced holding circuit for energizing the lower winding thereof in series with the lower winding of the fault relay R1140 and the winding of the reset relay R1145; whereby the reset relay R1145 reoperates. At this time, further operation of the link relays R1120, R1110, etc., depends upon the presence of ground potential upon the associated guard conductors C1102, C1104, etc. Finally, one of the link relays R1130, R1120, etc., is retained operated corresponding to the idle one of the links in the associated second group; whereby the idle link mentioned is assigned to the use of the next calling subscriber line in the second group of subscriber lines accessible to the finders of the links mentioned.

*Operation of the selector 700*

Now, assuming that the finder 600 of the first link illustrated has operated to find any one of the calling subscriber lines such, for example, as the subscriber line 690 extending to the calling subscriber substation T611. The selector 700 is conditioned to be responsive to the first digit dialed by virtue of the operation of the line relay R750 and the hold relay R760 as previously explained. More particularly, at this time, a loop circuit is completed between the calling subscriber substation T611 and the line relay R750 in the selector 700; which loop circuit extends respectively from ground and battery potentials by way of the lower and upper windings of the line relay R750, the contacts 744 and 743, the line conductors C732 and C731 of the trunk 730, the secondary contact set SC601, the first riser bus RB601, the primary contact set PC611 and the line conductors C692 and C691 of the subscriber line 690 to the calling subscriber substation T611. When the first digit is dialed at the calling subscriber substation T611, the above traced loop circuit is interrupted and then recompleted repeatedly; whereby the line relay R750 in the selector 700 follows. Each time the line relay R750 restores and then reoperates it completes and then interrupts, at the contacts 751, a circuit, including the contacts 764, for operating the digit relay R770 and a multiple circuit, including the contacts 782, for operating the magnet M723 of the marker switch 720; whereby the magnet M723 is operated and restored intermittently, thereby to drive the wipers noted of the marker switch 720 step by step in the clockwise direction away from their home positions. The digit relay R770 operates and remains operated during the digit, as it is of the slow-to-release type. Likewise, the hold relay R760 remains operated during the digit since it is of the slow-to-release type. When the wipers noted of the marker switch 720 are driven away from their home positions, the set of switch springs S726 is actuated for a purpose more fully explained hereinafter. Also, upon operating the digit relay R770 completes, at the contacts 773, a circuit, including the contacts 763 and 785, for energizing the lower winding of the control relay R780, thereby to cause the latter relay to operate through its first step to complete, at the contacts 783, a path, including the contacts 785 and 773, for short-circuiting the upper winding thereof; the control relay R780 being of the two-step type. At the conclusion of the digit the line relay R750 is maintained operated, thereby to retain operated the hold relay R760 and to prevent further operation of the magnet M723 of the marker switch 720. As the wiper 721 is driven step by step in the clockwise direction engaging the corresponding contacts in the associated contact bank, circuits, including the contacts 751′, are completed and then interrupted for operating sequentially the marking magnets MM701, MM702, etc.; whereby at the conclusion of the digit one of the marking magnets MM701, MM702, etc., occupies its operated position; the particular marking magnet operated corresponding to the number of impulses received in the digit.

By way of example, it is assumed that the first digit dialed at the calling subscriber substation T611 is the digit 2; whereby at the conclusion of this digit the corresponding second marking magnet MM702 in the switch mechanism SM700 occupies its operated position clutching the second primary bar PB702 to the associated primary operating element and clutching the second secondary bar SB702 to the associated secondary operating element. Shortly following the conclusion of the digit 2, the digit relay R770 restores as it is of the slow-to-release type interrupting, at the contacts 773, the previously traced path for short-circuiting the upper winding of the control relay R780; whereby a circuit, including the contacts 763, is completed for energizing in series the upper and lower windings of the control relay R780 in order to cause the latter relay to operate through its second step or completely. Upon operating completely the control relay R780 completes, at the contacts 781, a circuit, including the contacts 771, for operating the primary magnet PM711; whereby the primary operating element is operated in order to effect operation of the second primary bar PB702 clutched thereto by the operated second marking magnet MM702. When the second primary bar PB702 is thus operated the ten individual trunks in the second group, including the trunk 830, are respectively connected to the ten riser busses RB701 to RB700, inclusive, by the ten respectively associated primary contact sets PC720 to PC729, inclusive, that are operated at this time by the operated second primary bar PB702. Also, at this time, the wiper 722 of the marker switch 720 engages the second contact in the associated contact bank; whereby ground potential, at the contacts 765, is applied by way of the upper winding of the test relay R740 to the control conductor of the second riser bus RB702, and consequently by way of the operated primary contact set PC721 to the control conductor of the first trunk in the selected second group in order to test the idle or busy condition thereof. It will be appreciated that in the event the first trunk in the selected second group is idle at this time, battery potenial appears upon the control conductor thereof completing an obvious circuit for energizing the upper winding of the test relay R740; whereas, in the event the trunk mentioned is busy, ground potential appears upon the control conductor thereof completing an obvious path for short-circuiting the upper winding of the test relay R740. Accordingly, the test relay R740 tests the idle or busy condition of the first trunk in the selected second group, operating in the event the first trunk mentioned is tested as idle and remaining restored in the event that the first trunk mentioned is tested as being busy. Assuming that the first trunk in the selected second group is tested as being busy by the test relay R740 at this time, the test relay R740 remains restored; whereby a circuit is completed, at the contacts 712, incident to the operation of the primary magnet PM711 in order to cause further operation of the magnet M723 of the marker switch 720. The circuit mentioned extends from ground by way of the contacts 745, 772, 712, 762 and 724 and the magnet M723 to battery. When thus energized the magnet M723 operates to drive the wipers noted of the marker switch 720 an additional step in the clockwise direction and to interrupt, at the contacts 724, the circuit for energizing the magnet M723 in order to cause the magnet M723 to restore. Upon restoring the magnet M723 recompletes, at the contacts 724, the above-traced circuit for operating itself; whereby the magnet M723 is operated buzzer-fashion until the test relay R740 operates to interrupt, at the contacts 745, the above traced circuit for operating the magnet M723.

When the wiper 722 of the marker switch 720 is driven into engagement with the next contact in the associated contact bank the second trunk in the previously selected second group of trunks is tested by the test relay R740, as previously explained; whereby the test relay R740 is operated in the event the trunk mentioned is tested as being idle, thereby to arrest further operation of the magnet M723, as previously noted. Assuming that the first eight trunks in the second group are tested by the test relay R740 as being busy, the magnet M723 then operates to drive the wipers noted of the marker switch 720 back into their home positions; whereupon the test relay R740 tests the idle or busy condition of the ninth trunk 830 in the selected second group. Assuming that the ninth trunk 830 in the selected second group is idle at this time, battery potential appears upon the control conductor C833 thereof; battery potential being applied thereto by way of the contacts 831 and the upper winding of the transfer relay R840 in the connector 800, individual to the trunk 830. At this time a series circuit is completed for energizing the upper winding of the transfer relay R840 and the upper winding of the test relay R740, thereby to cause the relays mentioned to operate; the latter relay operating exceedingly fast, since it is of the polarized type, interrupting, at the contacts 745, the previously traced circuit for operating intermittently the magnet M723 of the marker switch 720. Accordingly, operation of the marker switch 720 is arrested at this time, while the tenth marking magnet MM700 occupies its opearted position clutching the tenth secondary bar SB700 to the associated secondary operating element. Also, upon operating the test relay R740 completes, at the contacts 742, an obvious circuit for operating the secondary magnet SM711; whereby the secondary operating element is operated bringing about operation of the tenth secondary bar SB700 clutched thereto; whereby the tenth secondary contact set SC700 is operated connecting the trunk 730 through the tenth riser bus RB700 to the ninth trunk 830 in the second group extending to the connector 800 individual thereto. Further, the test relay R740 interrupts, at the contacts 741, the previously traced circuit for maintaining operated the tenth marking magnet MM700; and completes, at the contacts 747, an obvious multiple path for applying ground potential to the first guard conductor C1102 extending into the allotter 1100. Further, the test relay R740 interrupts, at the contacts 746, the original path for applying battery potential by way of the resistor 748 to the control conductor C733 of the trunk 730; ground potential being applied to the control conductor C733 at this time, at the contacts 766 of the operated hold relay R760. Finally, the test relay R740 interrupts, at the contacts 743 and 744, the previously traced loop circuit extending from the calling subscriber substation T611 to the upper and lower windings of the line relay R750, thereby to cause the latter relay to restore, effecting the restoration of the hold relay R760 shortly thereafter, the hold relay R760 being of the slow-to-release type. Upon restoring the hold relay R760 prepares, at the contacts 761 an alternative circuit, including the contacts 724 and the set of switch springs S726, for operating the magnet M723 of the marker switch 720; which circuit is not completed in the present example by virtue of the fact that the wipers noted of the marker switch 720 happen to engage the home contacts in the associated contact banks actuating the set of switch springs S726 into open-circuit relation. Ordinarily the alternative circuit mentioned for operating the magnet M723 is completed, causing the magnet M723 to operate buzzer-fashion in order to drive the wipers noted of the marker switch 720 back into their home positions; at which time the set of switch springs S726 is actuated to interrupt the circuit mentioned for operating the magnet M723 in order to arrest further operation thereof. Further, the hold relay R760 interrupts, at the contacts 763, the previously traced circuit for energizing in series the upper and lower windings of the control relay H780, thereby to cause the latter relay to restore; and interrupts, at the contacts 766, the previously mentioned path for applying ground potential in the selector 700 to the control conductor C733 of the trunk 730; however, at this time, ground potential is applied to the control conductor C733 of the trunk 730 by virtue of the fact that the control conductor C833 of the trunk 830 is grounded in the connector 800, as explained more fully hereinafter. Finally, the hold relay R760 interrupts, at the contacts 767, the previously mentioned original path for applying ground potential to the first guard conductor C1102 extending into the allotter 1100. Upon restoring the control relay R780 interrupts, at the contacts 781, the previously traced circuit for energizing the primary magnet PM711; however, the associated primary operating element is not restored at this time due to the mechanical latching thereof by the secondary operating element, which secondary operating element is maintained in its operated position by virtue of the operated position of the secondary magnet SM711; whereas the secondary magnet SM711 is maintained in its operated position by the operated test relay R740. Finally, the test relay R740 is maintained in its operated position by virtue of the fact that the lower winding thereof is energized in a circuit including the grounded control conductor C733 of the trunk 730.

When the selector 700 is operated in the manner described above to select the ninth trunk 830 in the second group extending to the connector 800, a loop circuit is completed for energizing the upper and lower windings of the line relay R820 in the connector 800. This loop circuit extends from battery and ground potentials by way of the upper and lower windings of the line relay R820 and the contacts 813 and 815 to the line conductors C831 and C832 of the trunk 830; and therefrom by way of the tenth riser bus RB700 in the switch mechanism SM700 in the selector 700 to the line conductors C731 and C732 of the trunk 730 and therefrom by way of the first riser bus RE601 in the switch mechanism SM600 in the finder 600 to the line conductors C691 and C692 of the subscriber line 690 to the calling subscriber substation T611. When this loop circuit is completed the line relay R820 in the connector 800 operates. Also, incident to the operation of the selector 700 to select the trunk 830, ground potential, at the contacts 765 of the operated hold relay R760, was applied by way of the upper winding of the test relay R740 and the wiper 722 and the engaged home contact in the associated contact bank of the marker switch 720 to the control conductor of the tenth riser bus RB700, and consequently to the control conductor C833 of the trunk 830. This application of ground potential to the control conductor C833 of the trunk 830 completed a circuit, including the contacts 831, for energizing the upper winding of the transfer relay R840 in the connector 800, thereby to cause the latter relay to operate, as previously noted. Upon operating the transfer relay R840 prepares, at the contacts 844, a circuit traced hereinafter for energizing the winding of the hold relay R830; which circuit is completed, at the contacts 821, incident to the operation of the line relay R820. The circuit mentioned extends from the grounded control conductor C833 of the trunk 830 by way of the contacts 831, 892, 844 and 821 and the winding of R830 to battery. When thus energized the hold relay R830 operates to complete, at the contacts 836, a holding circuit, including the contacts 821, for energizing the winding thereof. Also, the hold relay R830 interrupts, at the contacts 831, the previously traced circuit for energizing the upper winding of the transfer relay R840; however, the latter relay does not immediately restore as it is of the slow-to-release type. Further, the hold relay R830 completes, at the contacts 832, an obvious path for applying ground potential to the control conductor C833, thereby to maintain operated the selector 700, the finder 600 and the cut-off relay R660 in the line circuit 650 individual to the subscriber line 690 extending to the calling subscriber substation T611. Further, the hold relay R830 completes, at the contacts 836, an alternative holding circuit, including the contacts 844 and 892, for energizing the upper winding of the transfer relay R840, thereby to retain the latter relay in its operated position. Further, the hold relay R830 completes, at the contacts 836, a circuit, including the contacts 821, 841 and 894, for energizing the lower winding of the control relay R890, thereby to cause the latter relay to operate through its first step to complete, at the contacts 893' a path, including the contacts 836, 821, 841, 894, 874 and 837, for short-circuiting the upper winding thereof; the control relay R890 being of the two-step type. At this time the connector 800 has been seized and is in readiness to receive the next digit dialed at the calling subscriber substation T611.

Reconsidering the operation of the selector 700 in response to the reception of the first digit 2 dialed at the calling subscriber substation T611, it is again noted that at the conclusion of the second digit 2, operation of the marker switch 720 is initiated and reoperates with the test relay R740 to find an idle trunk in the selected second group as previously described. However, it may occur that all of the trunks in the second group are busy at this time, in which case operation of the marker switch 720 continues by virtue of the failure of the test relay R740 to operate in response to the testing as idle of a trunk in this group. As the marker switch 720 continues to operate, the marking magnets MM701, MM702, etc., are operated sequentially and then restored in a cyclic manner; whereby the marker switch 720 causes the test relay R740 to test the trunks in the selected second group a plurality of times; and in the event any one of these trunks is tested as idle, operation of the test relay R740 occurs in the manner previously explained. This operation permits the selector 700 to find a trunk in the selected second group that has become idle between cyclic operations of the marker switch 720. However, in the event all of the trunks in the selected second group persist as busy, the next digit dialed at the calling subscriber substation T611 is received by the line relay R750 in the selector 700 instead of by the line relay R820 in the connector 800, since the selector 700 has not switched through to select an idle trunk in the selected second group. In this peculiar event the line relay R750 again follows the second digit dialed at the calling subscriber substation T611 to bring about operation of the digit relay R770 subsequent to complete operation of the control relay R780. When the digit relay R770 operates at this time there is completed, at the contacts 774, a path, including the contacts 785' and the condenser 786, for connecting the busy tone conductor C787 to the line conductor C731 of the trunk 730; whereby busy tone current is returned over the loop circuit to the calling subscriber substation T611 in order to indicate to the subscriber thereat that he should release the present connection in view of the all-trunks-busy condition appearing in the switch train. Also, upon operating the digit relay R770 interrupts, at the contacts 771, the previously traced circuit for maintaining operated the primary magnet PM711; whereby the associated primary operating element is released permitting the release of the second primary bar PB702, and the consequent release of the selected second group of trunks by the selector 700. The subsequent release of the finder 600 and the selector 700 of the link illustrated in response to the performance of a release operation at the calling subscriber substation T611 is substantially identical to that explained more fully hereinafter.

*Operation of the connector 800*

Now assume that a call has ben initiated at one of the subscriber substations in the second 100 group; that the finder 600 of the link illustrated has seized the calling line extending thereto; that the selector 700 of this link has seized the trunk 830 extending to the connector 800; and that the connector 800 has been prepared to respond to the next digit dialed at the calling subscriber substation; all in the manner previously explained. When the subscriber at the calling subscriber substation dials the next digit, the loop circuit extending to the line relay R820 in the connector 800 is interrupted intermittently; whereby the line relay R820 follows. Each time the line relay R820 restores and then reoperates, it interrupts and then recompletes, at the contacts 821, the previously traced circuit for energizing the winding of the hold relay R830, thereby to retain the latter relay in its operated position during the digit, since it is of the slow-to-release type. Also, each time the line relay R820 restores and then reoperates it completes and then interrupts, at the contacts 822, a circuit, including the contacts 836, 834, and T42, for energizing the lower winding of the transfer relay R840; as well as a multiple circuit, including the contacts 836 and 834, for energizing the magnet M923 of the marker switch 920; whereby the wipers noted of the marker switch 920 are driven step by step in the clockwise direction away from their home positions. Assuming that the present call is to be extended to the subscriber substation T602, the directory number of which is 202; the first digit dialed at the calling subscriber substation T611 was 2, which caused the selector 700 to operate in the manner previously explained to seize the connector 800; and the present second digit is 0. At the conclusion of the second digit 0, the wipers noted of the marker switch 920 have been driven ten steps in the clockwise direction away from their home positions back into their home positions; whereby the wiper 921 of the marker switch 920 engages the tenth contact in the associated contact bank completing a circuit, including the contacts 837, for energizing the tenth marking magnet MM900 in order to cause the latter magnet to operate and clutch the tenth primary bar PB900 to the associated primary operating element and clutch the tenth secondary bar SB900 to the associated secondary operating element. Also, when the wipers noted of the marker switch 920 are driven one step in the clockwise direction away from their home positions, the set of switch springs S926 is actuated to close the associated contacts; and when the wipers noted are driven back into their home positions, the set of switch springs S926 is again actuated to open the associated contacts.

Also, the first time the line relay R820 restores it interrupts, at the contacts 821, the previously traced path for short-circuiting the upper winding of the control relay R890; whereby the latter relay is operated through its second step or completely over a circuit, including the contacts 837, 874 and 893', as well as the upper and lower windings thereof in series. Upon operating completely the control relay R890 interrupts, at the contacts 892, the previously traced circuit for energizing the upper winding of the transfer relay R840. Accordingly, at the conclusion of the second digit 0, when the line relay R820 is maintained in its operated position, there is interrupted, at the contacts 822, the previously traced circuit for energizing the lower winding of the transfer relay R840; whereby shortly thereafter the latter relay restores, it being of the slow-to-release type. Upon restoring the transfer relay R840 completes, at the contacts 846, a circuit, including the contacts 898, for energizing the primary magnet PM911; whereby the associated primary operating element is operated to effect operation of the ten primary contact sets in the tenth group PC901, PC902, etc., and PC900; thereby to connect the ten subscriber lines, including the subscriber line 695 extending to the called subscriber substation T602, to the respective ten riser busses RB901, RB902, etc., and RB900. In the present example the subscriber line 695 extending to the called subscriber substation T602 is connected by the operated primary contact sets PC902 to the second riser bus RB902.

The subscriber at the calling subscriber substation then proceeds to dial the third digit 2; whereby the line relay R820 follows. Each time the line relay R820 restores and then reoperates it interrupts and then recompletes, at the contacts 821, the previously traced circuit for maintaining operated the hold relay R830, since the latter relay is of the slow-to-release type. Also, each time the line relay R820 restores and then reoperates it completes and then interrupts, at the contacts 822, the previously traced circuit for energizing the magnet M923 of the marker switch 920 and a multiple circuit, including the contacts 836, 834, 843 and 895, for energizing the winding of the busy relay R860. Accordingly, the busy relay R860 operates and being of the slow-to-release type remains operated during the third digit 2. Further, the magnet M923 of the marker switch 920 is operated and restored two additional times in accordance with the two impulses of the third digit 2; whereby the wipers noted of the marker switch 920 engage the second contacts in the associated contact banks. When the wipers noted of the marker switch 920 are again driven away from their home positions, the set of switch springs S926 is actuated. Upon operating the busy relay R860 completes, at the contacts 862, a circuit including the contacts 893, for operating the control relay R870; and interrupts, at the contacts 863, a point in a circuit traced hereinafter for energizing the lower winding of the test relay R880. Also, the busy relay R860 completes, at the contacts 864, a multiple circuit, including the contacts 837 and 893', for energizing in series the upper and lower windings of the control relay R890, thereby to prevent the latter relay from restoring when the control relay R870 operates to interrupt, at the contacts 874, the previously traced original circuit for energizing in series the upper and lower windings of the control relay R890.

At the conclusion of the third digit 2, the wipers noted of the marker switch 920 engage the second contacts in the associated contact banks, thereby to complete a circuit via the wiper 921 and the engaged second contact in the associated contact bank, and including the contacts 837, for energizing the second marking magnet MM902; whereby the latter magnet operates to clutch the second primary bar PB902 to the associated primary operating element and to clutch the second secondary bar SB902 to the associated secondary operating element. At the conclusion of the third digit 2, the line relay R820 is maintained in its operated position, thereby positively to prevent further operation of the marking magnets MM901, etc., and to cause the busy relay R860 to restore shortly thereafter, since the latter relay is of the slow-to-release type. Upon restoring the busy relay R860 inrupts, at the contacts 862, the previously traced circuit for maintaining operated the control relay R870; however, the latter relay does not restore immediately since it is of the slow-to-release type. Also, the busy relay R860 interrupts, at the contacts 864, the previously traced alternative circuit for energizing in series the upper and lower windings of the control relay R890, thereby to cause the latter relay to restore. Finally, upon restoring the busy relay R860 completes, at the contacts 863, a path for applying ground potential by way of the lower winding of the test relay R880 and the contacts 872 to the wiper 922 of the marker switch 920 and by way of the engaged second contact in the associated contact bank to the control control conductor of the second riser bus RB902; and consequently to the control conductor C598 of the subscriber line 695 extending to the called subscriber substation T602, since the second riser bus RB902 is connected by the operated primary contact set PC902 to the subscriber line 695. Further operation of the connector 800 depends upon the idle or busy condition of the called subscriber substation T602.

First assuming that the called subscriber substation T602 is busy at this time, ground potential appearing upon the control conductor C698 of the associated subscriber line 695 completes a path substantially identical to that previously traced for short-circuiting the lower winding of the test relay R880 in the connector 800, thereby to prevent operation thereof. Shortly thereafter the control relay R870 restores completing, at the contacts 871, an alternative circuit, including the contacts 836, 845, 885 and 896, for reoperating the busy relay R860. Upon reoperating the busy relay R860 interrupts, at the contacts 863, the previously traced test circuit, including the lower winding of the test relay R880; and completes, at the contacts 861, a path, including the condenser 816, the contacts 853, 891 and the condenser 865, for connecting the busy tone conductor C866 to the line conductor C831 of the trunk 830; whereby busy tone current is returned over the trunk 830, the selector 700, the trunk 730 and the finder 600 and the calling subscriber line to the calling subscriber substation, thereby to indicate to the subscriber thereat that the present connection cannot be completed due to the busy condition of the called subscriber substation T602. The subscriber at the calling subscriber substation then proceeds to release the operated finder 600, the selector 700 and the connector 800 in a manner more fully explained hereinafter.

Now assuming that the called subscriber substation T602 is idle at this time, battery potential appearing upon the control conductor C698 of the associated subscriber line 695 completes a circuit substantially identical to that previously traced for energizing the lower winding of the test relay R880 in the connector 800; whereby the latter relay operates shortly thereafter, it being of the slow-to-operate type; and completes, at the contacts 883, a holding circuit, including the contacts 833, for energizing the upper winding thereof; and completes, at the contacts 886, an obvious circuit for energizing the secondary magnet SM911. Upon operating the secondary magnet SM911 operates the associated secondary operating element, thereby to operate the second primary contact set SC902 associated with the second secondary bar SB902 that is clutched to the secondary operating element at this time by the operated second marking magnet MM902. Further, the operated secondary operating element latches the primary operating element in its operated position in order to prevent restoration thereof subsequent to restoration of the control relay R870. Further, the test relay R880 interrupts at the end of its stroke, at the contacts 887, the previously traced circuit for maintaining operated the second marking magnet MM902; and completes, at the contacts 881, a path, including the condenser 816, the contacts 853 and the condenser 857', for connecting the ring-back tone conductor C858 to the line conductor C831 of the trunk 830 in order to cause ring-back tone current to be returned over the trunk 830, the selector 700, the trunk 730, the finder 600 and the calling subscriber line to the calling subscriber substation, thereby to indicate to the subscriber thereat that the called subscriber substation T602 is being rung. Further, the test relay R880 completes, at the contacts 884, a path, including the contacts 872, for applying direct ground potential to the wiper 922 of the marker switch 920, and consequently by way of the engaged second contact in the associated contact bank to the control conductor of the second riser bus RB902, which ground potential is extended by way of the operated primary contact set PC902 to the control conductor C698 of the called subscriber line 695. This application of direct ground potential to the control conductor C698 of the called subscriber line 695 completes a circuit, including the contacts 677, for operating the cutoff relay R680 in the line circuit 670 individual to the called subscriber line 695. Upon operating the cutoff relay R680 interrupts, at the contacts 681 and 682, the normal connections between the left-hand and right-hand windings of the line relay R675 and the line conductors C696 and C697 of the subscriber line 695; and interrupts, at the contacts 683, the previously traced path for applying battery potential by way of the associated resistor 685 to the control conductor C698 of the subscriber line 695. Further, the cutoff relay R680 completes, at the contacts 684, a connection, including the contacts 677, between the control conductors C698 and C699 of the subscriber line 695; whereby the subscriber line 695 is marked as busy both to the other connectors 800, etc., in the second group having access thereto and to the finders 600, etc., in the second group having access thereto. When the second secondary contact set SC902 is operated direct ground potential on the control conductor C933 of the trunk 930 is connected to the control conductor of the second riser bus RB902, thereby to maintain operated the cutoff relay R680 in the line circuit 670 individual to the called subscriber line 695. Also, the lower winding of the ring cutoff relay R850, the battery 848 and the generator 847 are connected in series across the line conductors C931 and C932 of the trunk 930, and consequently by way of the operated second secondary contact set SC902 to the line conductors of the second riser bus RB902 and thence by way of the operated primary contact set PC902 to the line conductors C696 and C697 of the called subscriber line 695; whereby the ringer at the called subscriber substation T602 is operated.

Shortly after the test relay R880 operates, the control relay R870 restores to complete, at the contacts 874, a circuit, including the contacts 837, 888, 897 and 924 and the set of switch springs S926, for energizing the magnet M923 of the marker switch 920; whereby the magnet M923 operates to interrupt, at the contacts 924, the operating circuit thereof. Accordingly, the magnet M923 operates buzzer-fashion to drive the wipers noted of the marker switch 920 step by step in the clockwise direction back into their home positions; whereupon the set of switch springs S926 is actuated to interrupt the previously traced circuit for operating the magnet M923 of the marker switch 920. Further, the control relay R870 interrupts, at the contacts 872, the previously traced original path for applying ground potential to the control conductor of the second riser bus RB902; which operation is without effect, since the control conductor of the second riser bus RB902 is now connected to the grounded control conductor C933 of the trunk 930 by virtue of the operated second secondary contact set C902 as previously noted. Further, the control relay R870 interrupts, at the contacts 873, the previously traced circuit for maintaining operated the primary magnet PM911; which operation is without effect, since the primary operating element is latched in its operated position by the operated secondary operating element; whereas the secondary operating element is maintained in its operated position by the operated secondary magnet SM911; and finally, the secondary magnet SM911 is retained in its operated position by the operated test relay R880. The path for projecting ringing current over the called subscriber line 695 extends from the line conductors C931 and C932 of the trunk 930 by way of the contacts 851 and 854 to the generator 847, the battery 848 and the lower winding of the ring cutoff relay R850 arranged in series relation; and from the line conductors C931 and C932 of the trunk 930 by way of the previously traced path including the second riser bus RB902 to the line conductors C696 and C697 of the called subscriber line 695.

When the subscriber at the called subscriber substation T602 answers the call by removing the receiver of the telephone instrument thereat from his associated switchhook, a low resistance circuit substantially identical to that previously traced is completed for energizing the lower winding of the ring cutoff relay R850, thereby to cause the latter relay to operate shortly thereafter, it being of the combination slow-to-operate and slow-to-release type. Upon operating the ring cutoff relay R850 completes, at the contacts 857, a holding circuit, including the contacts 833, for energizing the upper winding thereof; and interrupts, at the contacts 851 and 854, the previously traced path for projecting ringing current over the called subscriber line 695. Also, the ring cutoff relay R850 interrupts, at the contacts 853, the previously traced path for returning ring back tone current over the calling subscriber line; and completes, at the contacts 852 and 855, an obvious connection between the upper and lower windings of the answer relay R810 and the line conductors C931 and C932 of the trunk 930; whereby the upper and lower windings of the answer relay R810 are energized over a loop circuit including the trunk 930 and the connected called subscriber line 695 extending to the called subscriber substation T602. When thus energized the answer relay R810 operates to reverse, at the contacts 812, 813, 814 and 815, the polarity of the line relay R820 with respect to the trunk 830; which reversal of polarity over the trunk 830, and consequently over the selector 700, the trunk 730, the finder 600 and the line conductors of the calling subscriber line may be employed for metering purposes in a conventional manner. Also, upon operating the answer relay R810 completes, at the contacts 811, multiple holding circuits, including the contacts 856 and 882, for energizing the upper windings of the ring cutoff relay R850 and the test relay R880. At this time, a loop circuit is completed between the calling subscriber substation and the line relay R820 in the connector 800; and a loop circuit is completed between the called subscriber substation T602 and the answer relay R810 in the connector 800. Finally, the line conductor C831 and C832 of the trunk 830 are operatively connected by the condensers 816 and 817 to the line conductors C931 and C932 of the trunk 930; whereby the loop circuit extending to the calling subscriber substation is connected to the loop circuit extending to the called subscriber substation T602 for conversational purposes.

*Release of the established connection*

For the purpose of illustration it may be assumed that the subscriber substation T611 is the calling subscriber substation; that the subscriber substation T602 is the called subscriber substation; and that the established connection therebetween includes the finder 600, the selector 700 and the connector 800; all in the manner previously explained. At the conclusion of the connection when the subscriber at the called subscriber substation T602 replaces the receiver of the telephone instrument thereat upon its associated switchhook, the previously traced loop circuit extending therefrom to the answer relay R810 in the connector 800 is interrupted, thereby to cause the latter relay to restore. Upon restoring the answer relay R810 interrupts, at the contacts 811, the previously mentioned multiple holding circuits for maintaining operated the ring cutoff relay R850 and the test relay R880; and again reverses, at the contacts 812, 813, 814 and 815, the polarity of the line relay R820 with respect to the line conductors of the trunk 830; which reversal of polarity over the trunk 830, and consequently the subscriber line 690 extending to the calling subscriber substation T611, may be employed for metering purposes in a conventional manner. Subsequently, when the subscriber at the calling subscriber substation T611 replaces the receiver of the telephone instrument thereat upon its associated switchhook, the previously traced circuit extending to the line relay R820 in the connector 800 is interrupted, thereby to cause the latter relay to restore. Upon restoring the line relay R820 interrupts, at the contacts 821, the previously traced circuit for maintaining operated the hold relay R830, thereby to cause the latter relay to restore shortly thereafter, it being of the slow-to-release type. Upon restoring the hold relay R830 interrupts, at the contacts 832, the previously mentioned path for applying ground potential to the control conductor C833 of the trunk 830; and interrupts, at the contacts 833, the previously traced multiple holding circuits for energizing the upper windings of the ring cutoff relay R850 and the test relay R880; whereby the test relay R880 restores immediately and the ring cutoff relay R850 restores shortly thereafter, it being of the combination slow-to-operate and slow-to-release type as previously noted. Upon restoring the test relay R880 interrupts, at the contacts 886, the previously mentioned circuit for maintaining operated the secondary magnet SM911; whereby the associated secondary operating element is released and returned to its normal position unlatching the primary operating element causing it to be released and returned to its normal position. At this time the switch mechanism SM900 in the connector 800 is completely released and ground potential therein is removed from the control conductor C698 of the called subscriber line 695 in order to effect the restoration of the cutoff relay R680 in the line circuit 670 individual to the subscriber line 695. Upon restoring the cutoff relay R680 recompletes, at the contacts 681 and 682, the connections between the right-hand and left-hand windings of the line relay R675 and the line conductors C696 and C697 of the subscriber line 695. Also, the cutoff relay R680 interrupts, at the contacts 684, the previously traced connection between the control conductors C698 and C699 of the subscriber line 695; whereby no potential appears upon the control conductor C699 and battery potential by way of the winding of the cutoff relay R680 and by way of the resistor 685 is applied to the control conductor C698. The removal of potential from the control conductor of the subscriber line 695 marks the subscriber line 695 as neither calling nor busy to the finders 600, etc., in the second group having access thereto; while the application of battery potential to the control conductor C698 of the subscriber line 695 marks the subscriber line 695 as idle to the connectors 800, etc., in the second group having access thereto.

At this time the connector 800 is completely released and available for further use; and when ground potential is removed from the control conductor C833 of the trunk 830, ground potential is removed from the control conductor C733 of the trunk 730, and consequently from the control conductor C694 of the subscriber line 690 extending to the calling subscriber substation T611. When ground potential is removed from the control conductor C694 of the subscriber line 690, the circuit for maintaining operated the cutoff relay R660 in the line circuit 650 individual to the subscriber line 690 is interrupted, thereby to cause the latter relay to restore. Upon restoring the cutoff relay R660 recompletes, at the contacts 661 and 662, the connections between the left-hand and right-hand windings of the line relay R655 and the line conductors C691 and C692 of the subscriber line 690. Also, the cutoff relay R660 interrupts, at the contacts 664, the previously traced connection between the control conductors C693 and C694 of the subscriber line 690; whereby no potential appears upon the control conductor C694 and battery potential is applied by way of the winding of the cutoff relay R660 and by way of the resistor 665 to the control conductor C693 of the subscriber line 690. The application of no potential to the control conductor C694 of the subscriber line 690 marks the subscriber line 690 neither as a calling line nor as a busy line to the finders 600, etc., in the second group having access thereto; whereas the application of battery potential to the control conductor C693 of the subscriber line 690 marks the subscriber line 690 as idle to the connectors 800, etc., in the second group having access thereto.

When ground potential is removed from the control conductor C733 of the trunk 730 the previously traced holding circuit for energizing the lower winding of the test relay R740 in the selector 700 is interrupted, thereby to cause the latter relay to restore. Upon restoring the test relay R740 interrupts, at the contacts 742, the previously mentioned circuit for maintaining operated the secondary magnet SM711; whereby the associated secondary operating element is released and restored to its normal position unlatching the primary operating element in order to cause it to be restored to its normal position. At this time the switch mechanism SM700 is completely released. Also, upon restoring the test relay R740 recompletes, at the contacts 743 and 744, the normal connections between the upper and lower windings of the line relay R750 and the line conductors C731 and C732 of the trunk 730; and recompletes, at the contacts 746, the previously traced path for applying battery potential by way of the resistor 748 to the control conductor C733 of the trunk 730. Finally, the test relay R740 interrupts, at the contacts 747, the previously mentioned path for applying ground potential to the first guard conductor C1102 extending into the allotter 1100, thereby to mark the first link illustrated in the second group as available for further use to the allotter 1100. Also, when ground potential is removed from the control conductor C733 of the trunk 730, the previously traced circuit for energizing the left-hand winding of the test relay R640 in the finder 600 is interrupted, thereby to cause the latter relay to restore. Upon restoring the test relay R640 interrupts, at the contacts 644, the previously mentioned circuit for maintaining operated the secondary magnet SM611; whereby the associated secondary operating element is released and restored to its normal position in order to unlatch the primary operating element so that it is released and restored to its normal position. At this time the switch mechanism SM600 in the finder 600 is completely released. Finally, the test relay R640 recompletes, at the contacts 646, the previously mentioned path for applying ground potential in the first link illustrated in the second group to the links-busy conductor C1109 in order to maintain operated the links-busy relay R1150 in the allotter 1100. At this time the finder 600 and the selector 700 are completely released; whereby this first link illustrated in the second group is available for further use when assigned again by the allotter 1100.

*Conclusions*

In view of the foregoing it is apparent that there has been provided an improved automatic telephone system comprising finders, selectors and connectors, each incorporating improved switching apparatus of the coordinate type.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A unitary switch comprising a plurality of primary members, a plurality of secondary members, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, said selecting magnets being selectively operative to select any one of said primary members and to select any one of said secondary members, and means for operating any selected one of said primary members and any selected one of said secondary members, the conjoint operations of said one primary member and said one secondary member completing a circuit through the individual contact set corresponding to said one secondary member in the group of contact sets corresponding to said one primary member.

2. A unitary switch comprising a plurality of primary members, a plurality of secondary members, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, said selecting magnets being selectively operative to select both any one of said primary members and the corresponding secondary member, means for operating said selected one primary member, said selecting magnets being selectively reoperative to select both any one of said secondary members and the corresponding primary member, and means for operating said selected one secondary member, the conjoint operations of said one primary member and said one secondary member completing a circuit through the individual contact set corresponding to said one secondary member in the group of contact sets corresponding to said one primary member.

3. Switching apparatus comprising a primary element, a plurality of primary members common to said primary element, a secondary element, a plurality of secondary members common to said secondary element, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, means for selectively operating said selecting magnets to select any one of said primary members and to select any one of said secondary members, means for operating said primary element in order to operate said selected one primary member, and means for operating said secondary element in order to operate said selected one secondary member, the conjoint operations of said one primary member and said one secondary member completing a circuit through the individual contact set corresponding to said one secondary member in the group of contact sets corresponding to said one primary member.

4. Switching apparatus comprising a primary element, a plurality of primary members common to said primary element, a secondary element, a plurality of secondary members common to said secondary element, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, means for selectively operating said selecting magnets to select any one of said primary members and to select any one of said secondary members, means for operating said primary element in order to operate said selected one primary member, means for operating said secondary element in order to operate said selected one secondary member, and latching mechanism responsive to operation of said secondary element for retaining operated said primary element, the conjoint operations of said one primary member and said one secondary member completing a circuit through the individual contact set corresponding to said one secondary member in the group of contact sets corresponding to said one primary member.

5. Switching apparatus comprising a plurality of primary members, a plurality of secondary members, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, control means for effecting sequential operation and subsequent restoration of said selecting magnets, first means for governing said control means to effect final operation of any given one of said selecting magnets, means for operating the one of said primary members corresponding to the finally operated one of said selecting magnets, second means for governing said control means to effect final reoperation of any given one of said selecting magnets, and means for operating the one of said secondary members corresponding to the finally reoperated one of said selecting magnets, the conjoint operations of said one primary member and said one secondary member completing a circuit through the individual contact set corresponding to said one secondary member in the group of contact sets corresponding to said one primary member.

6. Switching apparatus comprising a plurality of primary members, a plurality of secondary members, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, control means operative to effect cyclic operation and restoration of said selecting magnets, first means for initiating and then for arresting operation of said control means in order to effect final operation of any given one of said selecting magnets, means for operating the one of said primary members corresponding to the finally operated one of said selecting magnets, second means for initiating and then for arresting continued operation of said control means in order to effect final reoperation of any given one of said selecting magnets, and means for operating the one of said secondary members corresponding to the finally reoperated one of said selecting magnets, the conjoint operations of said one primary member and said one secondary member completing a circuit through the individual contact set corresponding to said one secondary member in the group of contact sets corresponding to said one primary member.

7. Switching apparatus comprising a plurality of primary members, a plurality of secondary members, a plurality of groups of contact sets respectively corresponding to said primary members, the individual contact sets in each of said groups of contact sets respectively corresponding to said secondary members, a plurality of selecting magnets respectively associated with said primary members and respectively associated with said secondary members so that any particular one of said selecting magnets is commonly associated with a particular one of said primary members and with a particular one of said secondary members, a marker switch having access to said selecting magnets, means for selectively operating said marker switch to select a first of said selecting magnets and then to select a second of said selecting magnets, means for operating said first selecting magnet in order to select both the corresponding one of said primary members and the corresponding secondary member, means for operating said second selecting magnet in order to select both the corresponding one of said secondary members and the corresponding primary member, and means for operating said one primary member and said one secondary member, the conjoint operations of said one primary member and said one secondary member completing a circuit through the contact set corresponding to said one secondary member in the group of contact sets corresponding to said one primary member.

8. Switching apparatus comprising a plurality of primary members, a plurality of groups of primary contact sets respectively corresponding to said primary members, a plurality of groups of lines respectively terminated by said groups of primary contact sets, a plurality of secondary members, a plurality of secondary contacts respectively corresponding to said secondary members, a plurality of busses respectively terminated by said secondary contact sets, a plurality of selecting magnets respectively associated with said primary members and respectively associated with said secondary members so that any particular one of said selecting magnets is commonly associated with a particular one of said primary members and with a particular one of said secondary members, means for selectively operating said selecting magnets to select any one of said primary members and to select any one of said secondary members, means for operating said selected one primary member, means controlled by the operation of said one primary member for operating the corresponding one of said groups of primary contact sets, the operation of said one group of primary contact sets connecting the individual lines in the one of said groups of lines terminated thereby respectively to said busses, a trunk, means for operating said selected one secondary member, and means controlled by the operation of said one secondary member for operating the corresponding one of said secondary contact sets, the operation of said one secondary contact set connecting the one of said busses terminated thereby to said trunk.

9. In a telephone system including a trunk and a plurality of groups of lines; a unitary switch comprising a plurality of primary members respectively corresponding to said groups of lines, a plurality of secondary members respectively corresponding to the individual lines in each of said groups of lines, and a plurality of selecting magnets respectively associated with said primary members and respectively associated with said secondary members so that any particular one of said selecting magnets is commonly associated with a particular one of said primary members and with a particular one of said secondary members; means responsive to a call on one line in one of said groups of lines for operating said selecting magnets to select the one of said primary members and the one of said secondary members respectively corresponding to said one group of lines and to said one line therein; means for operating said selected one primary member and said selected one secondary member; and means controlled by the conjoint operations of said one primary member and said one secondary member for connecting said calling one line in said one group of lines to said trunk.

10. In a telephone system including a trunk and a plurality of groups of lines; switching apparatus comprising a plurality of primary members respectively corresponding to said groups of lines, a plurality of secondary members respectively corresponding to the individual lines in each of said groups of lines, and a plurality of selecting magnets respectively associated with said primary members and respectively associated with said secondary members so that any particular one of said selecting magnets is commonly associated with a particular one of said primary members and with a particular one of said secondary members; means responsive to a call on one line in one of said groups of lines for operating a first of said selecting magnets associated with the one of said primary members corresponding to said one group of lines and for operating a second of said selecting magnets associated with the one of said secondary members corresponding to said one line;

means for operating said one primary member associated with said first selecting magnet; means for operating said one secondary member associated with said second selecting magnet; and means controlled by the conjoint operations of said one primary member and said one secondary member for connecting said calling one line in said one group of lines to said trunk.

11. In a telephone system including a trunk and a plurality of groups of lines; switching apparatus comprising a plurality of primary members respectively corresponding to said groups of lines, a plurality of secondary members respectively corresponding to the individual lines in each of said groups of lines, and a plurality of selecting magnets respectively associated with said primary members and respectively associated with said secondary members so that any particular one of said selecting magnets is commonly associated with a particular one of said primary members and with a particular one of said secondary members; control means for effecting sequential operation and subsequent restoration of said selecting magnets; first means responsive to a call on one line in one of said groups of lines for governing said control means to effect final operation of a first of said selecting magnets associated with the one of said primary members corresponding to said one group of lines; second means responsive to a call on said one line in said one group of lines for governing said control means to effect final reoperation of a second of said selecting magnets associated with the one of said secondary members corresponding to said one line; means for operating said one primary member associated with said first selecting magnet; means for operating said one secondary member associated with said second selecting magnet; and means controlled by the conjoint operations of said one primary member and said one secondary member for connecting said calling one line in said one group of lines to said trunk.

12. In a telephone system including a trunk and a plurality of groups of lines; switching apparatus comprising a plurality of primary members respectively corresponding to said groups of lines, a plurality of secondary members respectively corresponding to the individual lines in each of said groups of lines, and a plurality of selecting magnets respectively associated with said primary members and respectively associated with said secondary members so that any particular one of said selecting magnets is commonly associated with a particular one of said primary members and with a particular one of said secondary members; means responsive to a digit received over said trunk for operating a corresponding first of said selecting magnets; means for operating the one of said primary members associated with said first selecting magnet; means for operating a second of said selecting magnets associated with one of said secondary members corresponding to an idle one of the lines in the one of said groups of lines corresponding to said one primary member; means for operating said one secondary member; and means controlled by the conjoint operations of said one primary member and said one secondary member for connecting said trunk to said one line in said one group of lines.

13. In a telephone system including a trunk and a plurality of groups of lines; switching apparatus comprising a plurality of primary members respectively corresponding to said groups of lines, a plurality of secondary members respectively corresponding to the individual lines in each of said groups of lines, and a plurality of selecting magnets respectively associated with said primary members and respectively associated with said secondary members so that any particular one of said selecting magnets is commonly associated with a particular one of said primary members and with a particular one of said secondary members; means responsive to a first digit received over said trunk for operating a corresponding first of said selecting magnets; means for operating the one of said primary members associated with said first selecting magnet; means responsive to a second digit received over said trunk for operating a corresponding second of said selecting magnets; means for operating the one of said secondary members associated with said second selecting magnet; and means controlled by the conjoint operations of said one primary member and said one secondary member for connecting said trunk to the line corresponding to said one secondary member in the group of lines corresponding to said one primary member.

14. In a telephone system including a trunk and a plurality of groups of lines; switching apparatus comprising a plurality of primary members respectively corresponding to said groups of lines, a plurality of secondary members respectively corresponding to the individual lines in each of said groups of lines, and a plurality of selecting magnets respectively associated with said primary members and respectively associated with said secondary members so that any particular one of said selecting magnets is commonly associated with a particular one of said primary members and with a particular one of said secondary members; control means for effecting sequential operation and subsequent restoration of said selecting magnets; first means responsive to a first digit received over said trunk for governing said control means to effect final operation of a corresponding first of said selecting magnets; means for operating the one of said primary members associated with said first selecting magnet; second means responsive to a second digit received over said trunk for governing said control means to effect final re-operation of a corresponding second of said selecting magnets; means for operating the one of said secondary members associated with said second selecting magnet; and means controlled by the conjoint operations of said one primary member and said one secondary member for connecting said trunk to the line corresponding to said one secondary member in the group of lines corresponding to said one primary member.

15. In a telephone system including a trunk over which a plurality of switch directing signals are transmitted, an automatic switch associated with said trunk and provided with a switching mechanism, and a group of lines accessible to said mechanism; said switch comprising means responsive to a first switch directing signal transmitted over said trunk for operating said mechanism to select said group of lines and then for initiating further operation thereof to search for an idle line in said group of lines, means responsive to operation of said mechanism to find an idle one of the lines in said group of lines for arresting said searching operation thereof and for connecting said trunk to said one line in said group of lines, a second switch directing signal transmitted over said trunk normally being transmitted over said one mechanism and said one line in said group of lines, and means including a switch directing signal counting circuit responsive to a second switch directing signal transmitted over said trunk during said searching operation of said mechanism for returning a busy signal over said trunk.

16. In a telephone system including a trunk over which a plurality of switch directing signals are transmitted, an automatic switch associated with said trunk and provided with a switching mechanism, and a group of lines accessible to said mechanism; said switch comprising means responsive to a first switch directing signal transmitted over said trunk for operating said mechanism to select said group of lines and then for initiating further operation thereof to search for an idle line in said group of lines, means responsive to operation of said mechanism to find an idle one of the lines in said group of lines for arresting said searching operation thereof and for connecting said trunk to said one line in said group of lines, a second switch directing signal transmitted over said trunk normally being transmitted over said one mechanism and said one line in said group of lines, and means including a switch directing signal counting circuit responsive to a second switch directing signal transmitted over said trunk during said searching operation of said mechanism for arresting said searching operation thereof and for releasing said mechanism and for returning a busy signal over said trunk.

17. In a telephone system including a trunk over which a plurality of switch directing signals are transmitted, an automatic switch associated with said trunk and provided with a switching mechanism, and a group of lines accessible to said mechanism; said switch comprising a line relay normally connected to said trunk, means including said line relay and responsive to a first switch directing signal transmitted over said trunk for operating said mechanism to select said group of lines and then for initiating further operation thereof to search for an idle line in said group of lines, means responsive to operation of said mechanism to find an idle one of the lines in said group of lines for arresting said searching operation thereof and for disconnecting said line relay from said trunk and for connecting said trunk to said mechanism, a second switch directing signal transmitted over said trunk normally being transmitted over said mechanism and said one line in said group of lines, and means including a switch directing signal counting circuit governed by said line relay and responsive to a second switch directing signal transmitted over said trunk for returning a busy signal thereover.

18. In a telephone system including a trunk over which a plurality of switch directing signals are transmitted, an automatic switch associated with said trunk and provided with a switching mechanism, and a group of lines accessible to said mechanism; said switch comprising a line relay normally connected to said trunk, means including said line relay and responsive to a first switch directing signal transmitted over said trunk for operating said mechanism to select said group of lines and then for initiating further operation thereof to search for an idle line in said group of lines, means responsive to operation of said mechanism to find an idle one of the lines in said group of lines for arresting said searching operation thereof and for disconnecting said line relay from said trunk and for connecting said trunk to said mechanism, a second switch directing signal transmitted over said trunk normally being transmitted over said mechanism and said one line in said group of lines, and means including a switch directing signal counting circuit governed by said line relay and responsive to a second switch directing signal transmitted over said trunk for arresting said searching operation of said mechanism and for releasing said mechanism and for returning a busy signal over said trunk.

19. In a telephone system including a calling line over which digits are transmitted, a selector connected to said calling line, and a plurality of groups of trunks accessible to said selector; said selector comprising means responsive to a first digit transmitted over said calling line for selecting a corresponding one of said groups of trunks and then for searching said selected one group of trunks for an idle trunk therein, means responsive to the finding of an idle one of the trunks in said one group of trunks for switching said selector through to connect said calling line thereto, a second digit transmitted over said calling line normally being transmitted over said selector and said one trunk in said one group of trunks, and means including a switch directing signal counting circuit responsive to a second digit transmitted over said calling line prior to said switching through of said selector for returning a busy signal over said calling line.

20. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said busses; means for selectively operating said selecting device to select any first of said primary members and to select the corresponding first of said busses; means for operating said selected first primary member; means controlled by the operation of said first primary member for connecting the individual lines in the corresponding one of said groups of lines respectively to said busses; a tester operative to test any line connected to any bus selected by said selecting device; means controlled by said tester in the event the one of said lines in said one group of lines connected to said first bus selected by said selecting device is tested as having a predetermined condition thereon for operating the corresponding first of said secondary members; and means controlled by the operation of said first secondary member for connecting said first bus to said trunk.

21. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said busses; means for selectively operating said selecting device to select any first of said primary members and to select the corresponding first of said busses; means for operating said selected first primary member; means controlled by the operation of said first primary member for connecting the individual lines in the corresponding one of said groups of lines respectively to said busses; a tester operative to test any line connected to any bus selected by said selecting device; means controlled by said tester in the event the one of said lines in said one group of lines connected to said first bus selected by said selecting device is tested as having a given condition thereon for reoperating said selecting device to select a second of said primary members and to select the corresponding second of said busses; additional means controlled by said tester in the event that another of said lines in said one group of lines connected to said second bus selected by said selecting device is tested as having a predetermined condition thereon for operating the corresponding second of said secondary members; and means controlled by the operation of said second secondary member for connecting said second bus to said trunk.

22. In a telephone system including a trunk and a plurality of groups of lines; switching apparatus comprising a plurality of busses, a plurality of primary members respectively corresponding to said groups of lines, a plurality of primary members respectively corresponding to said busses; a selecting device having access to said primary members and to said secondary members and to said busses; means for selectively operating said selecting device to select any first of said primary members and to select the corresponding first of said secondary members and to select the corresponding first of said busses; means for operating said selected first primary member; means controlled by the operation of said first primary member for connecting the individual lines in the corresponding one of said groups of lines respectively to said busses; a tester operative to test any line connected to any bus selected by said selecting device; means controlled by said tester in the event the one of said lines in said one group of lines connected to said first bus selected by said selecting device is tested as having a predetermined condition thereon for operating said selected first secondary member; and means controlled by the operation of said first secondary member for connecting said first bus to said trunk.

23. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said secondary members and to said busses; means for selectively operating said selecting device to select any first of said primary members and to select the corresponding first of said secondary members and to select the corresponding first of said busses; means for operating said selected first primary member; means controlled by the operation of said first primary member for connecting the individual lines in the corresponding one of said groups of lines respectively to said busses; a tester operative to testing a line connected to any bus selected by said selecting device; means controlled by said tester in the event the one of said lines in said one group of lines connected to said first bus selected by said selecting device is tested as having a given condition thereon for reoperating said selecting device to select a second of said primary members and to select the corresponding second of said secondary members and to select the corresponding second of said busses; additional means controlled by said tester in the event that another of said lines in said one group connected to said second bus selected by said selecting device is tested as having a predetermined condition thereon for operating said selected second secondary member; and means controlled by the operation of said second secondary member for connecting said second bus to said trunk.

24. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said busses; means responsive to a call on one line in one of said groups of lines for operating said selecting device to select a first of said primary members corresponding to said one group of lines and to select the corresponding first of said busses; means for operating said selected first primary member; means controlled by the operation of said first primary member for connecting the individual lines in said one group of lines respectively to said busses; a tester operative to test any line connected to any bus selected by said selecting device; means controlled by said tester in the event said one calling line in said one group of lines is tested as being connected to said first bus selected by said selecting device for operating the corresponding first of said secondary members; and means controlled by the operation of said first secondary member for connecting said first bus to said trunk, in order to connect said one calling line in said one group of lines to said trunk.

25. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said busses; means responsive to a call on one line in one of said groups of lines for operating said selecting device to select a first of said primary members corresponding to said one group of lines and to select the corresponding first of said busses; means for operating said selected first primary member; means controlled by the operation of said first primary member for connecting the individual lines in said one group of lines respectively to said busses; a tester operative to test any line connected to any bus selected by said selecting device; means controlled by said tester in the event said one calling line in said one group of lines is tested as being disconnected from said first bus selected by said selecting device for reoperating said selecting device to select a second of said primary members and to select the corresponding second of said busses; additional means controlled by said tester in the event said one calling line in said one group of lines is tested as being connected to said second bus selected by said selecting device for operating the corresponding second of said secondary members; and means controlled by the operation of said secondary member for connecting said second bus to said trunk in order to connect said one calling line in said one group of lines to said trunk.

26. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said busses; means responsive to a digit received over said trunk for operating said selecting device to select a corresponding first of said primary members and to select the corresponding first of said busses; means for operating said selected first primary member; means controlled by the operation of said first primary member for connecting the individual lines in the corresponding one of said groups of lines respectively to said busses; a tester operative to test any line connected to any bus selected by said selecting device; means controlled by said tester in the event the one of said lines in said one group of lines connected to said first bus selected by said selecting device is tested as idle for operating the corresponding first of said secondary members; and means controlled by the operation of said first secondary member for connecting said first bus to said trunk.

27. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said busses; means responsive to a digit received over said trunk for operating said selecting device to select a corresponding first of said primary members and to select the corresponding first of said busses; means for operating said selected first primary member; means controlled by the operation of said first primary member for connecting the individual lines in the corresponding one of said groups of lines respectively to said busses; a tester operative to test any line connected to any bus selected by said selecting device; means controlled by said tester in the event the one of said lines in said one group of lines connected to said first bus selected by said selecting device is tested as busy for reoperating said selecting device to select a second of said primary members and to select the corresponding second of said busses; additional means controlled by said tester in the event that another of said lines in said one group of lines connected to said second bus selected by said selecting device is tested as idle for operating the corresponding second of said secondary members; and means controlled by the operation of said second secondary member for connecting said second bus to said trunk.

28. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said secondary members and to said busses; means responsive to a first digit received over said trunk for operating said selecting device to select a corresponding first of said primary members and to select the corresponding first of said secondary members and to select the corresponding first of said busses; means for operating said selected first primary member; means controlled by the operation of said first primary member for connecting the individual lines in the corresponding one of said groups of lines respectively to said busses; means responsive to a second digit received over said trunk for operating said selecting device to select a corresponding second of said primary members and to select the corresponding second of said secondary members and to select the corresponding second of said busses; a tester operative to test any line connected to any bus selected by said selecting device; means for operating said tester to test the one of said lines in said one group of lines connected to said second bus selected by said selecting device; means controlled by said tester in the event said one line in said one group of lines is tested as idle for operating said selected second secondary member; and means controlled by the operation of said second secondary member for connecting said second bus to said trunk.

29. In a telephone system including a trunk and a plurality of groups of lines; switching apparatus comprising a plurality of busses, a plurality of primary members respectively corresponding to said groups of lines, a plurality of secondary members respectively corresponding to said busses; a selecting device having access to said primary members and to said secondary members and to said busses; means responsive to a first digit received over said trunk for operating said selecting device to select a corresponding first of said primary members and to select the corresponding first of said secondary members and to select the corresponding first of said busses; means for operating said selected first primary member; means controlled by the operation of said first primary member for connecting the individual lines in the corresponding one of said groups of lines respectively to said busses; means responsive to a second digit received over said trunk for operating said selecting device to select a corresponding second of said primary members and to select the corresponding second of said secondary members and to select the corresponding second of said busses; a tester operative to test any line connected to any bus selected by said selecting device; means for operating said tester to test the one of said lines in said one group connected to said second bus selected by said selecting device; and means controlled by said tester in the event said one line in said one group of lines is tested as busy for returning a busy signal over said trunk.

30. A unitary switch comprising a plurality of groups of primary contact sets, a plurality of secondary contact sets respectively corresponding to the individual primary contact sets in each of said groups of primary contact sets, a plurality of selecting magnets respectively associated with said groups of primary contact sets and respectively associated with said secondary contact sets so that any particular one of said selecting magnets is commonly associated with a particular one of said groups of primary contact sets and with a particular one of said secondary contact sets, means for operating any given one of said selecting magnets to select the associated one of said groups of primary contact sets and the associated one of said secondary contact sets, and means for operating said selected one group of primary contact sets and said selected one secondary contact set, the conjoint operations of said one group of primary contact sets and said one secondary contact set completing a connection through the individual primary contact set corresponding to said one secondary contact set in said one group of primary contact sets and through said one secondary contact set.

31. A unitary switch comprising a plurality of groups of primary contact sets, a plurality of secondary contact sets respectively corresponding to the individual primary contact sets in each of said groups of primary contact sets, a plurality of primary members respectively associated with said groups of primary contact sets, a plurality of secondary members respectively associated with said secondary contact sets, a plurality of selecting magnets respectively associated with said primary members and respectively associated with said secondary members so that any particular one of said selecting magnets is commonly associated with a particular one of said primary members and with a particular one of said secondary members, means for operating any given one of said selecting magnets to select the associated one of said primary members and the associated one of said secondary members, means for operating said selected one primary member in order to operate the associated one of said groups of primary contact sets, and means for operating said selected one secondary member in order to operate the associated one of said secondary contact sets, the conjoint operations of said one group of primary contact sets and said one secondary contact set completing a connection through the individual primary contact set corresponding to said one secondary contact set in said one group of primary contact sets and through said one secondary contact set.

32. A unitary switch comprising a plurality of groups of primary contact sets, a plurality of secondary contact sets respectively corresponding to the individual primary contact sets in each of said groups of primary contact sets, a plurality of primary members respectively associated with said groups of primary contact sets, a primary element commonly associated with said primary members, a plurality of secondary members respectively associated with said secondary contact sets, a secondary element commonly associated with said secondary members, a plurality of selecting magnets respectively associated with said primary members and respectively associated with said secondary members so that any particular one of said selecting magnets is commonly associated with a particular one of said primary members and with a particular one of said secondary members, means for operating any given one of said selecting magnets to select the associated one of said primary members and the associated one of said secondary members, means including a primary magnet for operating said primary element, means controlled by operation of said primary element for operating said selected one primary member in order to operate the associated one of said groups of primary contact sets, means including a secondary magnet for operating said secondary element, and means controlled by operation of said secondary element for operating said selected one secondary member in order to operate the associated one of said secondary contact sets, the conjoint operations of said one group of primary contact sets and said one secondary contact set completing a connection through the individual primary contact set corresponding to said one secondary contact set in said one group of primary contact sets and through said one secondary contact set.

JOHN E. OSTLINE.

(References on following page)

REFERENCES CITED

The following references are of record in the file of this patent:

UNITED STATES PATENTS

| Number | Name | Date |
|---|---|---|
| 1,168,419 | Reynolds | Jan. 18, 1916 |
| 1,563,658 | Richard | Dec. 1, 1925 |
| 2,027,463 | Bascom | Jan. 14, 1936 |
| 2,118,935 | Magrath | May 31, 1938 |
| 2,250,101 | Hubbard | July 22, 1941 |
| 2,285,985 | King | June 9, 1942 |
| 2,298,205 | Erwin | Oct. 6, 1942 |
| 2,348,301 | Lomax | May 9, 1944 |
| 2,416,086 | Christian | Feb. 18, 1947 |

Certificate of Correction

Patent No. 2,519,849

August 22, 1950

JOHN E. OSTLINE

It is hereby certified that error appears in the printed specification of the above numbered patent requiring correction as follows:

Column 52, line 23, for "primary" read *secondary*; column 53, line 20, for the indistinct word before "first" read *corresponding*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*